United States Patent
Bresler et al.

(10) Patent No.: US 9,734,601 B2
(45) Date of Patent: Aug. 15, 2017

(54) HIGHLY ACCELERATED IMAGING AND IMAGE RECONSTRUCTION USING ADAPTIVE SPARSIFYING TRANSFORMS

(71) Applicant: The Board of Trustees of the University of Illinois, Urbana, IL (US)

(72) Inventors: Yoram Bresler, Urbana, IL (US); Luke A. Pfister, Urbana, IL (US); Saiprasad Ravishankar, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 14/678,876

(22) Filed: Apr. 3, 2015

(65) Prior Publication Data

US 2015/0287223 A1 Oct. 8, 2015

Related U.S. Application Data

(60) Provisional application No. 61/975,561, filed on Apr. 4, 2014.

(51) Int. Cl.
*G06K 9/00* (2006.01)
*G06T 11/00* (2006.01)

(52) U.S. Cl.
CPC ....... *G06T 11/006* (2013.01); *G06T 2211/424* (2013.01)

(58) Field of Classification Search
None
See application file for complete search history.

(56) References Cited

U.S. PATENT DOCUMENTS 7,461,038 B2 * 12/2008 Kropaczek ........... G05B 13/024
703/13
7,813,293 B2 * 10/2010 Papandriopoulos ..... H04B 3/32
370/201

(Continued)

OTHER PUBLICATIONS

Yeniay, "Penalty function methods for constrained optimization with genetic algorithms", Mathematical and Computational Applications, vol. 10, No. 1, pp. 45-56, 2005.*

(Continued)

*Primary Examiner* — Feng Niu
(74) *Attorney, Agent, or Firm* — Lowenstein Sandler LLP

(57) ABSTRACT

A system executes efficient computational methods for high quality image reconstructions from a relatively small number of noisy (or degraded) sensor imaging measurements or scans. The system includes a processing device and instructions. The processing device executes the instructions to employ transform learning as a regularizer for solving inverse problems when reconstructing an image from the imaging measurements, the instructions executable to: adapt a transform model to a first set of image patches of a first set of images containing at least a first image, to model the first set of image patches as sparse in a transform domain while allowing deviation from perfect sparsity; reconstruct a second image by minimizing an optimization objective comprising a transform-based regularizer that employs the transform model, and a data fidelity term formed using the imaging measurements; and store the second image in the computer-readable medium, the second image displayable on a display device.

20 Claims, 10 Drawing Sheets

(56) References Cited

U.S. PATENT DOCUMENTS

| | | | | |
|---|---|---|---|---|
| 8,811,700 | B2* | 8/2014 | Wang | G06T 11/006 382/128 |
| 8,860,856 | B2* | 10/2014 | Wetzstein | G06T 5/50 348/222.1 |
| 9,036,885 | B2* | 5/2015 | Elad | G06T 11/006 378/21 |
| 9,081,074 | B2* | 7/2015 | Kwak | A61B 5/0263 |
| 9,105,086 | B2* | 8/2015 | Salvador | G06T 5/003 |
| 9,285,449 | B2* | 3/2016 | Liu | G01R 33/443 |
| 9,313,465 | B2* | 4/2016 | Do | H04N 19/176 |
| 9,373,159 | B2* | 6/2016 | Amroabadi | A61B 6/5205 |
| 2007/0274404 | A1* | 11/2007 | Papandriopoulos | H04B 3/32 375/260 |
| 2012/0081114 | A1* | 4/2012 | Weller | G01R 33/5611 324/309 |
| 2012/0288003 | A1* | 11/2012 | Do | H04N 19/147 375/240.16 |
| 2013/0089151 | A1* | 4/2013 | Do | H04N 19/176 375/240.18 |
| 2013/0181711 | A1* | 7/2013 | Chaari | G01R 33/5611 324/309 |
| 2014/0023253 | A1* | 1/2014 | Hesthaven | G06T 11/003 382/131 |
| 2014/0056496 | A1* | 2/2014 | Kwak | A61B 5/0263 382/131 |
| 2016/0055658 | A1* | 2/2016 | Liang | G06T 11/006 382/131 |
| 2016/0070023 | A1* | 3/2016 | Herrmann | G06F 17/13 702/14 |

OTHER PUBLICATIONS

S.Ravishankar and Y.Bresler,"Sparsifying transform learning for compressed sensing MRI," in Proc. IEEE Int.Symp. Biomed. Imag., Apr. 7-11, 2013, pp. 17-20.

L. Pfister,"Tomographic reconstruction with adaptive sparsifying transforms," M.S. thesis, University of Illinois at Urbana Champaign, 2013.

L. Pfister and Y. Bresler,"Model based iterative tomographic reconstruction with adaptive sparsifying transforms," SPIE Cont. Computational Imaging XII, Mar. 2014.

L. Pfister and Y. Bresler,"Adaptive Sparsifying Transforms for Iterative Tomographic Reconstruction," to appear, Proc. 3rd CT Meeting, Utah, Jun. 22-25, 2014.

S. Ravishankar and Y. Bresler, "Closed-form solutions within sparsifying transform learning," in Proc. IEEE International Conference on Acoustics, Speech and Signal Processing (ICASSP), May 26-31, 2013, pp. 5378-5382.

S. Ravishankar and Y. Bresler, "Learning overcomplete sparsifying transforms for signal processing," in Acoustics, Speech and Sig. Proc (ICASSP), 2013, pp. 3088-3092.

S. Ravishankar and Y. Bresler. Closed Form Optimal Updates in Transform Learning. Poster presented at SPARS 2013, Jul. 8-11, 2013.

S. Ravishankar and Y. Bresler. Learning Overcomplete Signal Sparsifying Transforms. Poster presented at SPARS 2013, Jul. 8-11, 2013.

S. Ravishankar and Y. Bresler. Highly undersampled MRI using adaptive sparse representations. In IEEE International Symposium on Biomedical Imaging: From Nano to Macro, pp. 1585-1588, Mar. 30-Apr 2, 2011.

S. Ravishankar and Y. Bresler,"Learning sparsifying transforms," IEEE Trans. Signal Process., vol. 61, No. 5, pp. 1072-1086, 2013.

S. Ravishankar and Y. Bresler,"Learning sparsifying transforms for image processing," in IEEE Int. Conf. Image Process., Sep. 30-Oct. 3, 2012, pp. 681-684.

S. Ravishankar and Y. Bresler,"Learning doubly sparse transforms for image representation," in IEEE Int. Conf. Image Process., Sep. 30-Oct. 3, 2012, pp. 685-688.

S. Ravishankar and Y. Bresler, "MR image reconstruction from highly under sampled k-space data by dictionary learning," IEEE Trans. Med. Imag., vol. 30, No. 5, pp. 1028-1041, 2011.

S. Ravishankar and Y. Bresler. Adaptive sampling design for compressed sensing MRI. In Conf. Proc. IEEE Eng. Med. Biol. Soc., pp. 3751-3755, Aug. 30-Sep. 3, 2011.

M. Lustig, D.L. Donoho, and J.M. Pauly, "Sparse MRI: The application of compressed sensing for rapid MR imaging," Magn. Reson. Med., vol. 58, No. 6, pp. 1182-1195, 2007.

J. Trzasko and A. Manduca, "Highly under sampled magnetic resonance image reconstruction via homotopic I0-minimization," IEEE Trans. Med. Imag., vol. 28, No. 1, pp. 106-121, 2009.

Y. Wang, L. Ying, and Y. Zhou, "Under sampled dynamic magnetic resonance imaging using patch-based spatiotemporal dictionaries," in Proc. 10th IEEE Int. Symp. Biomed. Imag., San Francisco, CA, Apr. 2013, pp. 294-297.

M. Elad, P. Milanfar, and R. Rubinstein, "Analysis versus synthesis in signal priors," Inverse Problems, vol. 23, No. 3, pp. 947-968, 2007.

S. Ravishankar and Y. Bresler, "Learning doubly sparse transforms for images," IEEE Trans. Image Process., vol. 22, No. 12, pp. 4598-4612, 2013.

E. Y. Sidky and X.Pan, "Image reconstruction in circular cone-beam computed tomography by constrained, total-variation minimization," Physics in medicine and biology, vol. 53, No. 17, p. 4777, 2008.

J.-B. Thibault, K. D. Sauer, C. A. Bouman, and J. Hsieh, "A three-dimensional statistical approach to improved image quality for multislice helical {CT}," Med. Phys., vol. 34, No. 11, p. 4526, 2007.

G. T. Herman and R. Davidi, Image reconstruction from a small number of projections, Inverse problems, vol. 24, No. 4, pp. 45\, 011-45\, 028, Aug. 2008.

H. Y. Liao and G. Sapiro, "Sparse representations for limited data tomography," in 2008 IEEE International Symposium on Biomedical Imaging: From Nano to Macro IEEE, May 2008, pp. 1375-1378.

J. Shtok, M. Elad, and M. Zibulevsky, "Sparsity-based sinogram denoising for low-dose computed tomography," in 2011 IEEE International Conference on Acoustics, Speech and Signal Processing (ICASSP) No. 1 IEEE, May 2011, pp. 569-572.

Q. Xu, H. Yu, and X. Mou, "Low-dose x-ray {CT} reconstruction via dictionary learning," IEEE} Trans. Med. Imag., vol. 31, No. 9, pp. 1682-1697, Sep. 2012.

B. Vandeghinste, B. Goossens, R. Van Holen, C. Vanhove, A. Pizurica, S. Vandenberghe, and S. Staelens, "Iterative {CT} reconstruction using shearlet-based regularization," 1 IEEE, Trans. vol. 60, No. 5 Oct. 2013.

S. D. Babacan, X. Peng, X. P. Wang, M. N. Do, and Z. P. Liang, "Reference-guided sparsifying transform design for compressive sensing MRI," in Conf. Proc. IEEE Eng. Med. Biol. Soc., 2011, pp. 5718-5721.

K. Sauer and C. Bouman, "A local update strategy for iterative reconstruction from projections," IEEE Trans. Signal Process., vol. 41, No. 2, pp. 534-548, 1993.

S. Hawe, M. Kleinsteuber, and K. Diepold, "Analysis operator learning and its application to image reconstruction," IEEE Trans. Image Process., vol. 22, No. 6, pp. 2138-2150, Jun. 2013.

M. Yaghoobi, S. Nam, R. Gribonval, and M. E. Davies, "Constrained overcomplete analysis operator learning for cosparse signal modelling," IEEE Trans. Signal Process., vol. 61, No. 9, pp. 2341-2355, May 2013.

R. Rubinstein, T. Peleg, and M. Elad, "Analysis K-SVD: A dictionary—learning algorithm for the analysis sparse model," IEEE Trans. Signal Process., vol. 61, No. 3, pp. 661-677, Feb. 2013.

J. Fessler and S. Booth, "Conjugate-gradient preconditioning methods for shift-variant PET image reconstruction," IEEE Trans. Image Process., vol. 8, No. 5, pp. 688-699, Jan. 1999.

Ramani and J. Fessler, "A splitting-based iterative algorithm for accelerated statistical x-ray CT reconstruction," IEEE Trans. Med. Imag., vol. 31, No. 3, pp. 677-688, Mar. 2012.

X. Zhang, M. Burger, and S. Osher, "A unified primal-dual algorithm framework based on bregman iteration," Journal of Scientific Computing, vol. 46, No. 1, pp. 20-46, Jan. 2011.

(56) References Cited

OTHER PUBLICATIONS

Pratt, W., Kane, J., and Andrews, H., "Hadamard transform image coding," Proceedings of the IEEE 57(1) (1969).
Ramani, S., Liu, Z., Rosen, J., Nielsen, J., and Fessler, J., "Regularization parameter selection for nonlinear iterative image restoration and MRI reconstruction using GCV and SURE-based methods.," IEEE Trans. Image Process. , 1-16 (Apr. 2012).
Afonso, M. V., Bioucas-Dias, J. M., and Figueiredo, M. A. T., "An augmented lagrangian approach to the constrained optimization formulation of imaging inverse problems," IEEE Trans. Image Process. 20(3), 681-695 (2011).
Boyd, S. and Vandenberghe, L., [Convex Optimization], Cambridge University Press (2004).
Boyd, S., Parikh, N., Chu, E., Peleato, B., and Eckstein, J., "Distributed optimization and statistical learning via the alternating direction method of multipliers," Foundations and Trends in Machine Learning 3(1), 1-122 (2010).
Eckstein, J. and Bertsekas, D., "On the Douglas-Rachford splitting method and the proximal point algorithm for maximal monotone operators," Mathematical Programming 55(1-3), 293-318 (1992).
Basu, S. and De Man, B., Branchless distance driven projection and back projection, 60650Y-60650Y-8, SPIE—International Society for Optical Engineering (Feb. 2006).
Wang, J., Li, T., Lu, H., and Liang, Z., "Penalized weighted least-squares approach to sinogram noise reduction and image reconstruction for low-dose x-ray computed tomography," IEEE Transactions on Medical Imaging 25, 1272-1283 (Oct. 2006).
Aharon, M., Elad, M., and Bruckstein, A., "K-SVD: An algorithm for designing overcomplete dictionaries for sparse representation," Structure 54(11), 4311-4322 (2006).
Yu, Z., Noo, F., Dennerlein, F., Wunderlich, A., Lauritsch, G., and Hornegger, J., "Simulation tools for two-dimensional experiments in x-ray computed tomography using the FORBILD head phantom," Physics in medicine and biology 57, N237-52 (Jul. 2012).
A. C. Kak and M. Slaney, Principles of computerized tomographic imaging. Society of Industrial and Applied Mathematics, 2001.
T. M. Buzug, Computed Tomography: From Photon Statistics to Modern Cone-Beam CT. Berlin/Heidelberg: Spinger-Verlag, 2008.
L. Rudin, S. Osher, and E. Fatemi, "Nonlinear total variation based noise removal algorithms," Physica D: Nonlinear Phenomena, vol. 60, pp. 259-268, 1992.
S. Osher, M. Burger, D. Goldfarb, J. Xu, and W. Yin, "An iterative regularization method for total variation-based image restoration," Multiscale Modeling & Simulation, vol. 4, No. 2, pp. 460-489, Jan. 2005.
S. Mallat and Z. Zhang, "Matching pursuits with time-frequency dictionaries," IEEE Trans. Signal Process. vol. 41, No. 12, pp. 3397-3415, 1993.
Y. Pati, R. Rezaiifar, and P. Krishnaprasad, "Orthogonal matching pursuit: recursive function approximation with applications to wavelet decomposition," Proceedings of 27th Asilomar Conference on Signals, Systems and Computers, pp. 40-44, 1993.
D. Needell and J. Tropp, "CoSaMP: Iterative signal recovery from incomplete and inaccurate samples," Applied and Computational Harmonic Analysis, vol. 26, No. 3, pp. 301-321, May 2009.
J. Mairal, F. Bach, J. Ponce, and G. Sapiro, "Online dictionary learning for sparse coding," in Proceedings of the 26th Annual International Conference on Machine Learning. ACM, 2009, pp. 689-696.
R. Rubinstein, M. Zibulevsky, and M. Elad, "Double sparsity: Learning sparse dictionaries for sparse signal approximation," IEEE Trans. Signal Process., vol. 58, No. 3, pp. 1553-1564, 2010.
S. Nam, M. Davies, M. Elad, and R. Gribonval, "The cosparse analysis model and algorithms," Applied and Computational Harmonic Analysis, vol. 34, pp. 30-56, Mar. 2012.
R. Giryes and M. Elad, "Denoising with greedy-like pursuit algorithms," The 19th European Signal Processing Signal Processing Conference, pp. 1475-1479, 2011.

M. Yaghoobi, S. Nam, R. Gribonval, and M. E. Davies, "Constrained overcomplete analysis operator learning for cosparse signal modelling," IEEE Transactions on Signal Processing, vol. 61, No. 9, pp. 2341-2355, May 2013.
A. Delaney and Y. Bresler, "Globally convergent edge-preserving reg- ularized reconstruction: an application to limited-angle tomography," IEEE Trans. Image Process., vol. 7, No. 2, pp. 204-221, Jan. 1998.
E. Garduno, G. T. Herman, and R. Davidi, "Reconstruction from a few projections by (1)-minimization of the Haar transform," Inverse problems, vol. 27, No. 5, pp. 1-19, May 2011.
B. Vandeghinste, B. Goossens, R. Van Holen, C. Vanhove, A. Pizurica, S. Vandenberghe, and S. Staelens, "Iterative CT reconstruction using shearlet-based regularization," Proc. SPIE 8313 Medical Imaging, vol. 8313, pp. 83 133I-83 133I-7, 2012.
I. Elbakri and J. Fessler, "Statistical image reconstruction for polyenergetic x-ray computed tomography," IEEE Trans. Med. Imag., vol. 21, No. 2, pp. 89-99, Feb. 2002.
S. Ramani and J. Fessler, "Statistical x-ray CT reconstruction using a splitting-based iterative algorithm with orthonormal wavelets," in 2012 9th IEEE International Symposium on Biomedical Imaging (ISBI). IEEE, May 2012, pp. 1008-1011.
J. Fessler, "Conjugate-gradient preconditioning methods: Numerical results department of electrical engineering and computer science," University of Michigan, Ann Arbor, Tech. Rep. 303, 1997.
S. Basu and Y. Bresler, "O (n (2) log (2) n) filtered backprojection reconstruction algorithm for tomography," IEEE Trans. Image Process., vol. 9, No. 10, pp. 1760-1773, Jan. 2000.
B. De Man and S. Basu, "Distance-driven projection and backprojection," 2002 IEEE Nuclear Science Symposium Conference Record, vol. 3, pp. 1477-1480, 2003.
Z. Wang, A. C. Bovik, H. R. Sheikh, and E. P. Simoncelli, "Image quality assessment: from error visibility to structural similarity," IEEE Trans. Image Process., vol. 13, No. 4, pp. 600-612, Apr. 2004.
Z. Yu, F. Noo, F. Dennerlein, A. Wunderlich, G. Lauritsch, and J. Hornegger, "Simulation tools for two-dimensional experiments in x-ray computed tomography using the FORBILD head phantom," Physics in medicine and biology, vol. 57, No. 13, pp. N237-N252, Jul. 2012.
E. Y. Sidky, C. M. Kao, and X.Pan, "Accurate image reconstruction from few-views and limited-angle data in divergent-beam ct," Journal of X-ray Science and Technology, vol. 14, No. 2, pp. 119-139, 2006.
Pfister, Luke, and Yoram Bresler, "Tomographic reconstruction with adaptive sparsifying transforms," In 2014 Institute of Electrical and Electronics Engineers (IEEE) International Conference on Acoustics, Speech and Signal Processing (ICASSP), pp. 6914-6918 (Apr. 14, 2014).
Ravishankar S. and Y. Bresler, "Multiscale dictionary learning for MRI," In Proceedings of International Society for Magentic Resonance in Medicine (ISMRM), p. 2830., (2011).
S. Ravishankar and Y.Bresler, "Learning Sparsifying Transforms for Signal and Image Processing," In Society for Industrial and Applied Mathematics (SIAM) Conference on Imaging Science, p. 51 (May 20-22, 2012).
Beck A. and Teboulle M., "A fast iterative shrinkage-thresholding algorithm for linear inverse problems," SIAM Journal on Imaging Sciences 2, pp. 183-202 (Jan. 2009).
Goldstein T. and Osher S., "The split bregman method for I1-regularized problems," SIAM Journal on Imaging Sciences 2, pp. 323-343 (Jan. 2009).
B. Natarajan, "Sparse approximate solutions to linear systems," SIAM journal on computing, vol. 24, No. 2, pp. 227-234 (1995).
P. Charbonnier, L. Blanc-Feraud, G. Aubert and M. Barlaud, "Deterministic edge-preserving regularization in computed imaging," IEEE Trans. Image Process., vol. 6, No. 2, pp. 298-311 (Jan. 1997).
G. T. Herman and R. Davidi, "On image reconstruction from a small number of projections," Inverse problems, vol. 24, No. 4, pp. 45 011-45 028 (Aug. 2008).
Buzug, "Computed Tomography: From Photon Statistics to Modern Cone-Beam CT," Berlin/Heidelberg: Spinger-Verlag, ch. 6, pp. 201-207 (May 20, 2008).

(56) References Cited

OTHER PUBLICATIONS

Liang, "Principles of Magnetic Resonance Imaging: A Signal Processing Perspective," IEEE Press, ch. 5, pp. 166-168 (Nov. 1999).
Devaney, "Mathematical Foundation of Imaging, Tomography and Wavefield Inversion," Cambridge University Press, ch. 8, pp. 367-374 (Jun. 21, 2012).

* cited by examiner

Algorithm 1 Transform Learning

INPUT: Initial transform $\Phi^0$, training data $\{x_j\}_{j=1}^{N_x}$
OUTPUT: Learned transform $\Phi$; sparse codes $z_j$ 1: $i \leftarrow 0$
2: repeat
3:   if (P1) then
4:     $z_j^i \leftarrow H_{s_j}(\Phi^i x_j)$ for $j = 1, \ldots, N_x$
5:     $\Phi^i \leftarrow \arg\min_\Phi \sum_{j=1}^{N_x} \{0.5 \|\Phi x_j - z_j^i\|_2^2\} + \alpha Q(\Phi)$
6:   else
7:   if (P2) then
8:     $z_j^i \leftarrow \text{prox}_g(\Phi^i x_j, \gamma)$ for $j = 1, \ldots, N_x$
9:     $\Phi^i \leftarrow \arg\min_\Phi \sum_{j=1}^{N_x} \{0.5 \|\Phi x_j - z_j^i\|_2^2 + \gamma \|z_j^i\|_0\} + \alpha Q(\Phi)$
10:   end if
11:   end if
12:   $i \leftarrow i + 1$
13: until Halting condition (H1)

*FIG. 1*

Algorithm 2 Algorithm to solve (18b) Using ADMM for $x$ update step

INPUT: Initial transform $\Phi$, observed data $y$
OUTPUT: Reconstructed image $x$ 1: $x^0 \leftarrow \text{FBP}(y)$
2: $t \leftarrow 0$
3: repeat
4:   repeat
5:     $z_j^{t+1} \leftarrow \text{prox}_g(\Phi^t R_j x^t, \gamma)$ for $j = 1, \ldots, N_x$
6:     $\Phi^{t+1} \leftarrow \arg\min_\Phi \sum_{j=1}^{N_x} \{0.5\|\Phi x_j - z_j^{t+1}\|_2^2\} + \alpha Q(\Phi)$
7:   until Halting condition (H2)
8:   $i \leftarrow 0$, $u^0 \leftarrow Ax^t$, $\eta^0 \leftarrow \vec{0}$
9:   repeat
10:     Use preconditioned CG to find approximate solution $\tilde{x}^{i+1}$ of
$(\mu A^T A + \lambda \sum_{j=1}^{N_x} R_j^T (\Phi^{t+1})^T \Phi^{t+1} R_j) \tilde{x}^{i+1} = \mu A^T (u^i - \eta^i) + \lambda \sum_{j=1}^{N_x} R_j^T (\Phi^{t+1})^T z_{i,j}$
11:     $u^{i+1} \leftarrow (W + \mu I)^{-1} (Wy + \mu(A\tilde{x}^{i+1} + \eta^i))$
12:     $\eta^{i+1} \leftarrow \eta^i - (u^{i+1} - A\tilde{x}^{i+1})$
13:     $i \leftarrow i + 1$
14:   until Halting condition (H4)
15:   $x^{t+1} \leftarrow \tilde{x}^{i+1}$
16:   $t \leftarrow t + 1$
17: until Halting condition (H3)

*FIG. 3*

Algorithm 3 Algorithm to solve (18b) Using Linearized ADMM for $x$ update step

INPUT: Initial transform $\Phi$, observed data $y$
OUTPUT: Reconstructed image $x$ 1: $x^0 \leftarrow \text{FBP}(y)$
2: $t \leftarrow 0$
3: repeat
4:    repeat
5:       $z_j^{t+1} \leftarrow \text{prox}_g(\Phi^t R_j x^t, \gamma)$ for $j = 1, 2, \ldots, N_x$
6:       $\Phi^{t+1} \leftarrow \arg\min_\Phi \sum_{j=1}^{N_x} \{0.5\|\Phi x_j - z_j^{t+1}\|_2^2\} + \alpha Q(\Phi)$
7:    until Halting condition (H2)
8:    Calculate $D_\Phi$
9:    $i \leftarrow 0, u^0 \leftarrow Ax^t, \eta^0 \leftarrow \bar{0}$
10:    repeat
11:       $\bar{x}^{i+1} \leftarrow F_2^H(\lambda D_\Phi + \delta I_N)^{-1} F_2 \left( \lambda \sum_{j=1}^{N_x} R_j^T (\Phi^{t+1})^T z_j^{t,i+1} + \delta x^i + \mu A^T(u^i - \eta^i - Ax^i) \right)$
12:       $u^{i+1} \leftarrow (W + \mu I)^{-1}(Wy + \mu(A\bar{x}^{i+1} + \eta^i))$
13:       $\eta^{i+1} \leftarrow \eta^i - (u^{i+1} - A\bar{x}^{i+1})$
14:       $i \leftarrow i + 1$
15:    until Halting condition (H4)
16:    $x^{t+1} \leftarrow \bar{x}^{i+1}$
17:    $t \leftarrow t + 1$
18: until Halting condition (H3)

*FIG. 4*

Algorithm 4 FISTA for u-update in (44)

1: $u^0 \leftarrow W^{\frac{1}{2}}(v^i - y)$
2: $t^0 \leftarrow 1$
3: $L \leftarrow 1/\|W\|_\infty$
4: repeat
5: $\quad \tilde{\zeta}^i \leftarrow u^i - \frac{\mu}{L}\left(W^{-1}u^i - W^{-\frac{1}{2}}(\eta^i + Ax^{i+1} - y)\right)$
6: $\quad \zeta^i \leftarrow \sqrt{\varepsilon} \cdot \tilde{\zeta}^i / \|\tilde{\zeta}^i\|_2$
7: $\quad t^{i+1} \leftarrow (1 + \sqrt{1 + 4(t^i)^2})/2$
8: $\quad u^{i+1} \leftarrow \zeta^i + \frac{t^i-1}{t^{i+1}}(\zeta^i - \zeta^{i-1})$
9: $\quad i \leftarrow i + 1$
10: until Halting condition (H5)
11: $v^{i+1} \leftarrow W^{-\frac{1}{2}}\zeta^i + y$

*FIG. 5*

Algorithm 5 Algorithm to Solve (19b)
INPUT: Initial transform $\Phi$, observed data $y$
OUTPUT: Reconstructed image $x$ 1: $x^0 \leftarrow \text{FBP}(y)$
2: $t \leftarrow 0$
3: repeat
4:   repeat
5:     $z_j^{i+1} \leftarrow \text{prox}_{z_j}(\Phi^i R_j x^t, \gamma)$ for $j = 1, \ldots, N_x$
6:     $\Phi^{i+1} \leftarrow \arg\min_\Phi \sum_{j=1}^{N_x} \{0.5 \|\Phi x_j - z_j^{i+1}\|_2^2\} + \alpha Q(\Phi)$
7:   until Halting condition (H2)
8:   $i \leftarrow 0, u^0 \leftarrow Ax^t, \eta^0 \leftarrow \vec{0}$
9:   repeat
10:     Use preconditioned CG to find approximate solution $\tilde{x}^{i+1}$ of
    $(\mu A^T A + \lambda \sum_{j=1}^{N_x} R_j^T (\Phi^{i+1})^T \Phi^{i+1} R_j) \tilde{x}^{i+1} = \mu A^T (u^i - \eta^i) + \lambda \sum_{j=1}^{N_x} R_j^T (\Phi^{i+1})^T z_j^i$
11:     Use Algorithm 4 to solve
    $u^{i+1} \leftarrow \arg\min_u l_C(u) + \frac{\mu}{2} \|u - (A\tilde{x}^{i+1} + \eta^i)\|_2^2$
12:     $\eta^{i+1} \leftarrow \eta^i - (u^{i+1} - A\tilde{x}^{i+1})$
13:     $i \leftarrow i + 1$
14:   until Halting condition (H4)
15:   $x^{t+1} \leftarrow \tilde{x}^{i+1}$
16:   $t \leftarrow t + 1$
17: until Halting condition (H3)

*FIG. 6*

Algorithm 6 Algorithm for MRI reconstruction using sparsity constraint

INPUT: Initial transform $\Phi$, observed data $y$, initial sparsity $s$
OUTPUT: Reconstructed image $x$ 1: $x^0 \leftarrow$ zero-filled reconstruction.
2: $\Phi^0 \leftarrow \Phi$; $z_j^0 \leftarrow R_j x^0 \; \forall \; j$
3: $t \leftarrow 0$; $i \leftarrow t$
4: repeat
5:     Update $\Phi^{t+1}$ and $z_j^{t+1} \; \forall \; j$ using Transform Learning Algorithm 1, with training data $\{x_j^t\}_{j=1}^{N_x}$ and $s_j^t = s$
    $\forall \; j$, and parameter $\alpha$.
6:     for each $j$ do
7:       $s_j^{t+1} \leftarrow 0$
8:       $\tilde{x}_j^{t+1} \leftarrow ((\Phi^{t+1})^H \Phi^{t+1} + \tau I)^{-1} \tau R_j x^t$
9:       $\tilde{z}_j^{t+1} \leftarrow 0$
10:       while $\|\tilde{x}_j^{t+1} - R_j x^t\|_2^2 > C$ do
11:         $s_j^{t+1} \leftarrow s_j^{t+1} + 1$
12:         $\tilde{z}_j^{t+1} \leftarrow H_{s_j^{t+1}}(\Phi^{t+1} \tilde{x}_j^t)$
13:         $\tilde{x}_j^{t+1} \leftarrow ((\Phi^{t+1})^H \Phi^{t+1} + \tau I)^{-1} (\tau R_j x^t + (\Phi^{t+1})^H \tilde{z}_j)$
14:       end while
15:     end for
16:     $x^{t+1} = \left( F_u^H F_u + \tau \sum_j R_j^T R_j \right)^{-1} \left( F_u^H y + \tau \sum_j R_j^T \tilde{x}_j^{t+1} \right)$
17:     $t \leftarrow t + 1$
18: until Halting condition (H3)

*FIG. 7*

Algorithm 7 Algorithm for MRI reconstruction using sparsity penalty

INPUT: Initial transform $\Phi$, observed data $y$
OUTPUT: Reconstructed image $x$ 1: $x^0 \leftarrow$ zero-filled reconstruction.
2: $t \leftarrow 0$
3: repeat
4:   repeat
5:     $z_j^{t+1} \leftarrow \text{prox}_{bj}(\Phi^t R_j x^t, \gamma)$ for $j = 1, \ldots, N_x$
6:     $\Phi^{t+1} \leftarrow \arg\min_\Phi \sum_{j=1}^{N_x} \left\{ 0.5 \|\Phi R_{j,x^t} - z_j^{t+1}\|_2^2 + \gamma \|z_j^{t+1}\|_0 \right\} + \alpha Q(\Phi)$
7:   until Halting condition (H2)
8:   Calculate $D_{\Phi^{t+1}}$.
9:   $x^{t+1} \leftarrow F_2^H (\Delta + \lambda D_{\Phi^{t+1}})^{-1} F_2 \left( F_u^H y + \sum_j R_j^T (\Phi^{t+1})^H z_j^{t+1} \right)$
10:   $t \leftarrow t + 1$
11: until Halting condition (H3)

*FIG. 8*

HIGHLY ACCELERATED IMAGING AND IMAGE RECONSTRUCTION USING ADAPTIVE SPARSIFYING TRANSFORMS

REFERENCE TO EARLIER FILED APPLICATION

This application claims the benefit under 35 U.S.C. §119(e) of U.S. Provisional Patent Application No. 61/975,561, filed Apr. 4, 2014, which is incorporated herein, in its entirety, by this reference.

FEDERALLY SPONSORED RESEARCH

This invention was made with Government support under NSF Grant CCF-1018660 and CCF-1320953 by the National Science Foundation. The United States Government has certain rights in the invention.

TECHNICAL FIELD

The present disclosure relates to image reconstruction and denoising, and more particularly to efficient computational methods for high quality image reconstructions from imperfect, incomplete, or degraded data, such as a relatively small number of noisy (or degraded or truncated) sensor measurements or scans, or data that deviates from the mathematical models of the data acquisition process.

BACKGROUND

There have existed a number of drawbacks in previous imaging modalities, including medical imaging modalities such as magnetic resonance imaging ("MRI") and computer tomography ("CT") scanning.

MRI

MRI allows excellent visualization of anatomical structure and physiological function. However, it is a relatively slow imaging modality because the data, which are samples in k-space of the spatial Fourier transform of the object, are acquired sequentially in time. Therefore, numerous techniques have been proposed to reduce the amount of data required for accurate reconstruction, with the aim of enabling much higher clinical throughput, or accurately capturing time varying phenomena such as motion, changes in concentration, flow, etc., or avoiding artifacts due to such phenomena.

Compressed Sensing (CS) enables accurate image recovery from far fewer measurements than required by traditional Nyquist sampling. In order to do so, CS employs the sparsity or approximate sparsity of the underlying signal in some transform domain, dictionary, or basis, and a sampling pattern that is incoherent, in an appropriate sense, with the transform, dictionary, or basis. However, the reconstruction method is non-linear. Furthermore, compressed sensing MRI ("CSMRI") reconstructions with fixed, non-adaptive sparsifying transforms typically suffer from many artifacts at high undersampling factors. One limitation of these CSMRI methods is their non-adaptivity to the measured data.

CT

Iterative reconstructions in x-ray CT attempt to recover high quality images from imperfect data, such as low-dose and/or incomplete or limited data, or to overcome artifacts due to the presence of dense objects, or imperfect models of the data acquisition process. To facilitate dose reduction, low-dose imaging methods typically incorporate detailed mathematical models of the image acquisition process, including models of the CT system, noise, and images. The mathematical models are combined into an unconstrained or constrained optimization problem, which is then solved using an optimization algorithm. The signal model takes the form of a function called a regularizer, which penalizes signals which do not fit the prescribed model, or constrains the solution to fit these models.

Choosing an appropriate regularizer, however, is not easy. Traditionally, the regularizer is based on a fixed, analytic transformation that causes images to become sparse or approximately sparse in some transform domain, dictionary, or basis. For example, total-variation regularization utilizes a finite-differencing matrix, and methods based on wavelet transformations have been successful. These signal models do not fully capture the relevant details of CT images. For example, total-variation regularization can result in images that have patchy artifacts as a result of the simplistic signal model. Reconstruction quality can be improved by incorporating better signal models.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 1 is Algorithm 1, an overall transform learning algorithm embodiment.

FIG. 3 is Algorithm 2, an example method for computed tomography (CT) reconstruction with adaptive sparsifying transforms.

FIG. 4 is Algorithm 3, an exemplary method for CT reconstruction with adaptive sparsifying transforms using the linearized Alternating Direction Method of Multipliers (ADMM).

FIG. 5 is Algorithm 4, an exemplary u-update method using a fast, iterative shrinkage-thresholding algorithm (FISTA) for Algorithm 5, solving a CT reconstruction problem with adaptive sparsifying transforms in a constrained formulation.

FIG. 6 is Algorithm 5, an exemplary alternative method for CT reconstruction with adaptive sparsifying transforms using a constrained problem formulation.

FIG. 7 is Algorithm 6, an exemplary method for magnetic resonance imaging (MRI) reconstruction with adaptive sparsifying transforms using a sparsity constraint.

FIG. 8 is Algorithm 7, an exemplary method for MRI reconstruction with adaptive sparsifying transforms using a sparsity penalty.

DETAILED DESCRIPTION

Figure 2:
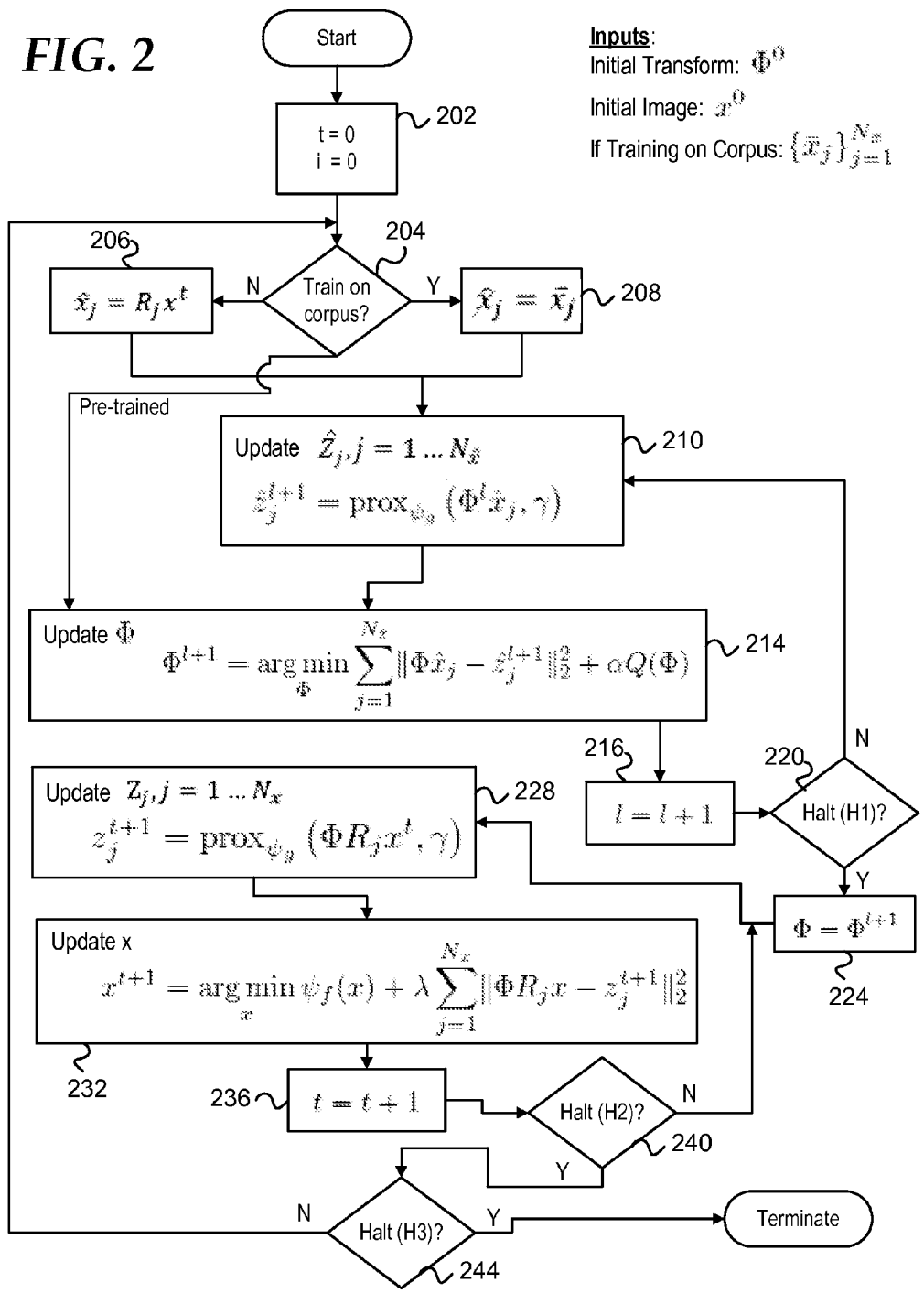
FIG. 2 is a flow chart depicting decision flow of alternating minimization for inverse problems with learned sparsifying transform regularization.

By way of introduction, the present disclosure discloses a highly efficient computational process for the reconstruction of high-quality images from imperfect, incomplete, or degraded data, such as a relatively small number of noisy (and/or degraded and/or truncated) sensor measurements or scans, or data that deviates from the mathematical models of the data acquisition process To enable the recovery of good images from limited or reduced quality measurement imaging data, one of skill in the art chooses a good model that captures essential properties of the image to be reconstructed. Such a model can be used in an iterative reconstruction method, which combines a physics and statistics-based model for the data acquisition, with the model for the image properties.

The disclosed reconstruction method relies on a transform model, wherein sub-images (also called patches) of the images are modeled as sparse in a transform domain. Unlike traditional methods, in which the model is fixed a priori, and usually postulated based on mathematical considerations, herein the transform model itself is adapted to the data based on imperfect, incomplete, or degraded measured data, such as a relatively small number of noisy (and/or degraded and/or truncated) measurements. The disclosed method allows for fast scans and highly accelerated image reconstructions, and is suitable for various imaging modalities such as Magnetic resonance Imaging (MRI), Computed Tomography (CT), Positron Emission Tomography (PET), computed optical imaging (such as OCT), computed photography, geophysical imaging, astronomy, and the like. For purposes of explanation, the disclosure focuses on its use in CT and MRI.

In its application to CT, the disclosure is a new process and computational method for the formation of x-ray computed tomography (CT) images. The process uses the data acquired by CT scanners to: (1) determine a sparse representation for the reconstructed image, called transform learning; and (2) reconstruct a high-quality image that is consistent with this sparse representation, from imperfect, degraded, incomplete, noisy, or few measurements, for example from measurements taken with reduced x-ray dose. The ability to image with reduced x-ray dose reduces the risk of harm to the patient caused by x-ray radiation. This allows for the use of CT in applications where radiation exposure is harmful; for example, in lung cancer screening, or in imaging of young patients or pregnant women. This can also reduce the time needed to acquire the data in industrial or security CT scanners. Similarly, the ability to image with incomplete measurements can enable accurate reconstruction of the important body parts of patients whose body does not fit fully in the field of view of the CT scanner, and the ability to image with a reduced number of measurements, using the principles of compressed sensing, can enable to reduce both x-ray dose and time needed to acquire the data. Furthermore, the ability to image with degraded measurements can help overcome image artifacts due to the presence of dense objects, or due to object (e.g., patient) motion during the data acquisition.

In its application to MRI, the disclosure is a new process and computational method for the formation of magnetic resonance images from degraded or incomplete data such as under-sampled k-space measurements. The reduced k-space measurements allow for fast scans, thereby potentially increasing clinical throughput, or improving the imaging of moving organs, or transient effects, such as brain activations in fMRI, or a contrast injection in coronary MRI. On the other hand, the method also provides high quality reconstructions from very few measurements, while being highly efficient in doing so. The reconstruction in MRI, just as in CT, relies on the adaptation of the transform model (which is a highly efficient sparsity-based image model) to the data.

A system (such as the system 1000 discussed with reference to FIG. 10) that provides for fast and high quality image reconstructions from highly under-sampled or otherwise degraded measurements, the system enables rapid data acquisition and image generation in imaging systems. The system 1000 of FIG. 10 may be designed to execute a portion or all of the functions, algorithms, approaches, methods and processes disclosed herein to adapt a transform model to actual image data while also reconstructing an image based on that model through regularization with adaptive sparsifying transforms. The overall potential benefits of the system include improved throughput, reduced harm to patients thanks to lower dosage of radiation, reduction of the cost of the imaging instrument (e.g., CT gantry), reduction of the cost of the reconstruction computer compared to competing methods. The features and benefits for CT and MRI in particular are as follows, listed by way of example to other imaging modalities.

MRI is widely used for non-invasive and non-ionizing imaging of the brain, knee, heart, blood vessels, and the like. Therefore, it is expected that the present disclosure would impact a wide range of diagnostic, spectroscopic, and interventional MRI applications and schemes. As mentioned above, the disclosure allows for both a fast data acquisition (by collecting fewer measurements), and a fast image reconstruction, while providing better image quality/resolution over previous methods.

The disclosed transform learning method computationally scales much better with the size of the imaged data (e.g., data patches) compared to the current state-of-the-art techniques. These properties will prove highly advantageous in applications such as dynamic MR imaging, 4D MRI, and the like, where the size of the imaged data is considerably large.

CT is widely used for non-invasive medical imaging, but the benefits of imaging are weighed against the potential for harm to the patient. It is expected that the present disclosure will allow for the more frequent use of CT imaging by reducing the risk to the patient. CT is also used in security scanning, where the use of the disclosed embodiments can provide lower false alarms and improved detection of threats. CT is also used in industrial and scientific imaging, where the present disclosure can enable faster and more accurate imaging.

Countless problems, from medical imaging to statistical inference to geological exploration, can be stated as the recovery of high-quality data from incomplete or corrupted linear measurements. The goal of imaging can be stated as to recover an unknown signal $x \in \mathbb{R}^N$ from linear measurements $y \in \mathbb{R}^M$ related to the signal through $$y = Ax + e \quad (1)$$

where $e \in \mathbb{R}^M$ is a perturbation or noise vector, and the measurement matrix $A \in \mathbb{R}^{M \times N}$ models the data acquisition process. For Magnetic Resonance Imaging (MRI), A represents a Fourier sampling matrix, while in X-ray Computed Tomography (CT) A models the forward integral projections. For image denoising, we set $A = I_N$, the N×N identity matrix.

We are often unable to reconstruct x accurately by finding the least squares or minimum norm solution of Equation (1). Such is the case when e is non-zero, or A is poorly conditioned or does not have full column rank, such that the inverse problem is underdetermined, ill-posed, or ill-conditioned. In these cases, an accurate solution is possible by incorporating an a priori model of the solution. One tactic is to solve the variational problem $$x^* = \underset{x}{\operatorname{argmin}}\, f(x, y) + \lambda J(x). \qquad (2)$$

Here, f(x,y) represents a data fidelity term that measures the discrepancy between a candidate solution x and the measurements y. One choice for MRI is $f(x,y)=0.5\|y-Ax\|_2^2$. In CT imaging, f may incorporate additional assumptions about the measurement statistics, and one choice is $f(x,y)= 0.5\|y-Ax\|_W^2$. Here, $W \in \mathbb{R}^{M \times M}$ is a diagonal matrix with entries $W_{mm} > 0$, motivated by the assumed underlying statistical model. More generally, f(x,y) can be chosen as the negative log likelihood of the measurement data y conditioned on the unknown image x. We can further improve our reconstruction by incorporating a model of the solution image. This is the role of functional $J(\cdot): \mathbb{R}^N \to \mathbb{R}$, which penalizes images that do not match our prescribed model.

The positive scalar λ is called the regularization parameter, and controls the bias-variance tradeoff induced by the regularizer. Unfortunately, the optimal choice of λ requires knowledge of the value of J(x) evaluated at the true image, information to which we do not have access. Instead, the usual approach is to tune λ to provide the best empirical reconstruction. This generally involves performing reconstructions for many values of λ followed by selecting the best reconstruction. Such an approach is burdensome for CT reconstruction, where even a single reconstruction requires significant time and computational resources. The difficulty of parameter selection has motivated several automatic parameter tuning strategies for linear inverse problems; for example, those based on Stien's Unbiased Risk Estimator.

We may have a priori knowledge of the statistical behavior of the data fidelity term f(x,y). For example, when $f(x,y)=\|y-Ax\|_2^2$ and our measurements are corrupted by iid Gaussian noise with standard deviation σ, we can apply the Central Limit Theorem and observe that $\|y-Ax\|_2^2 \leq (M+ 2\sqrt{2M})\sigma^2$ with probability exceeding 0.98. This can motivate a constrained optimization of the form $$x^* = \underset{x}{\operatorname{argmin}}\, J(x) \text{ s.t. } f(x, y) \leq \varepsilon, \qquad (3)$$

where the tolerance level ε is chosen using the prescribed statistical noise model. Because the noise standard deviation is often known or can be estimated, this approach removes the need to tune the regularization parameter λ.

We can write Equations (2) and (3) in a unified form by introducing some additional notation. For notational convenience, we do not show explicitly the dependence on y. Let $I_C(x)$ be a barrier (aka an indicator) function for the constraint set; that is, $$I_C(x) = \begin{cases} 0 & f(x, y) \leq \varepsilon \\ \infty & \text{else} \end{cases}. \qquad (4)$$

Next, we define the function $\psi_f(x): \mathbb{R}^N \to \mathbb{R}$ based on the problem in Equations (2) or (3). For Equation (3), we let $\psi_f(x)=I_C(x)$; while for Equation (2), we let $\psi_f(x)=f(x,y)$. Then we can write both Equations (2) and (3) as:

$$x^* = \underset{x}{\operatorname{argmin}}\, \psi_f(x) + \lambda J(x). \qquad (5)$$

Vectors are written using lower case letters such as x. The m-th element of a vector x will be written x[m]. Matrices are written using capital letters, such as A. Superscripts will be used to denote iteration number in an iterative algorithm, with $x^i$ being the value of x at the i-th iteration.

Sparsity-Based Regularization

Some choices for J(x) include the total-variation (TV) seminorm, the $l_1$ norm of the wavelet coefficients of the image, or the q-generalized Gaussian Markov random field (qGGMRF) regularization functional. A trait shared by these regularizers is that they promote images that are sparse under a particular representation; for example, TV promotes images that are sparse under a finite-differencing operator. Such images are piecewise-constant. Although these regularizers have been shown to be effective for both CT and MR imaging, regularizers that promote piecewise constant images can replace complex texture by patchy, uniform regions. More sophisticated regularizers, such as the combination of $l_1$ and shearlets, have been shown to preserve complex texture at the cost of poorer performance on uniform regions.

Recent years have shown the promise of sparse representations that are directly adapted to a class of signals rather than being analytically designed. One approach is to assume that small, overlapping image patches can be formed by the product of a matrix called a dictionary, and a vector called a sparse code. This is known as the synthesis sparsity model, and many algorithms have been proposed to find such a dictionary and sparse codes, given a set of training data. These algorithms tend to alternate between updating the dictionary and updating the sparse codes. Regularization based on the synthesis sparsity model has been shown to be effective for image denoising, MRI, and both low-dose and limited-angle CT. Unfortunately, the sparse coding update step is NP-Hard and algorithms to approximate a solution generally scale poorly with data size. As a result, dictionary-learning based regularization can dramatically increase the computational cost of the already challenging problems of image reconstruction in inverse problems, such as CT or MRI reconstruction.

An alternative sparse signal model is to assume that image patches become sparse when acted on by a linear operator called an analysis operator. Recently, there has been an increase in the development of algorithms that use the analysis sparsity model. Many of these algorithms use the analysis model, which suggests that a signal x should be exactly sparse when acted on by a linear transform Ω. When x is corrupted by noise the model can be extended to the noisy analysis model by taking x=q+e, where e is a (small) error in the signal domain, and Ωq=z is sparse. Unfortunately, as in the synthesis sparsity model, algorithms to learn Ω and find the corresponding sparse codes z are also NP-Hard, and algorithms to find an approximate solution are computationally expensive.

Recently, some of the inventors proposed several algorithms to learn signal representations based on the transform sparsity model. In this framework, data is assumed to satisfy Φx=z+v where z is sparse and v is small. The signal x need only be approximately sparsified when acted on by the matrix Φ, which is called a sparsifying transform. Transform sparsity, named as such owing to its similarity with transform coding schemes, can be viewed as an alternative approximation to the co-sparse analysis model. The primary distinction between the noisy analysis and transform signal models is that the latter allows for deviation from exact sparsity in the transform, rather than in the signal, domain. This characteristic allows for the design of efficient algorithms to learn sparsifying transforms from data. Regularization with adaptive sparsifying transforms has been shown to provide state-of-the-art performance in low-dose CT and MRI imaging applications.

Transform Learning

For a collection of training data vectors $\{x_j\}_{j=1}^{N_x}$, with $x_j \in \mathbb{R}^k$, we write the transform learning problem in either a constrained form:

$$\min_{\Phi, z_j} \sum_{j=1}^{N_x} \{0.5\|\Phi x_j - z_j\|_2^2\} + \alpha Q(\Phi) \quad (P1)$$

$$\text{s.t. } \|z_j\|_0 \leq s_j, \, j = 1, 2, \ldots, N_x$$

or in a penalized form:

$$\min_{\Phi, z_j} \sum_{j=1}^{N_x} \{0.5\|\Phi x_j - z_j\|_2^2 + \gamma g(z_j)\} + \alpha Q(\Phi) \quad (P2)$$

where $g: \mathbb{R}^k \to \mathbb{R}$ is a sparsity promoting penalty. Some choices include the so-called zero norm $g(z) = \|z\|_0$, which counts the number of non-zero entries in z, or the $l_1$ norm $g(z) = \|z\|_1$. The sparsity constraint $\|z_j\|_0 \leq s_j \forall j$ in (P1) could alternatively be replaced with a sparsity constraint on all the sparse codes taken together, e.g., the constraint $\Sigma_{j=1}^{N_x} \|z_j\|_0 \leq s_j$.

The first term in the objective in both (P1) and (P2) is the sparsification error, and measures the deviation of $\Phi x_j$ from exact sparsity.

The term $Q(\Phi)$ with weight α is the transform learning regularizer. Its purpose is to control the properties of the transform that is learned from the training data. In particular, the transform learning regularizer prevents trivial solutions such as the zero solution, or solutions that have repeated rows, or more generally, solutions that have poor condition number or high coherence between the rows. Some examples of useful choices are listed next.

For square transform matrices Φ, the transform learning regularizer $$Q(\Phi) = -\log|\det \Phi| + \|\Phi\|_F^2 \quad (5b)$$

is one possible choice. The negative log determinant term penalizes matrices Φ with nearly linearly dependent rows or columns, and together with the Frobenius norm penalty enables full control over the condition number and scaling of Φ via the choice of the weight α in (P1) or (P2). The larger the value of a, the closer the condition number of Φ is to unity. Thus, α provides a tradeoff between the sparsification error and the condition number of Φ. Another possible choice is $$Q(\Phi) = \chi(\Phi) = \begin{cases} 0 & \Phi^T \Phi = I_k \\ \infty & \text{else} \end{cases}, \quad (5c)$$

that is, $\chi(\Phi)$ is the indicator function of the set of matrices satisfying $\Phi^T \Phi = I_k$. This constrains Φ obtained as a solution to (P1) or (P2) to be exactly orthonormal or unitary. When dealing with complex valued data such as in MRI, we replace the constraint $\Phi^T \Phi = I_k$ with $\Phi^H \Phi = I_k$, where $(\cdot)^H$ denotes the matrix Hermitian operation. Yet another choice is a doubly sparse transform learning regularizer of the form $$Q(B) = -\log|\det B| + \|B\|_F^2 + \chi'(B), \quad (5d)$$

with $\Phi = B \Phi_0$, where $\Phi_0$ is a fixed transform and $\chi'(B)$ is the indicator function of the set of matrices satisfying $\|B\|_0 \leq r$ for some desired constant r, where $\|B\|_0$ denotes the number of nonzeros in the matrix B. The fixed transform may be chosen as a fast transform such as the DCT (Discrete Cosine Transform), DFT (Discrete Fourier Transform), or wavelets, which is known to be an effective sparsifier for patches of the images of interest. The doubly-sparse transform learning regularizer provides a computationally efficient operation with good control over the condition number of Φ, and good sparsification properties (through the sparsification error term in (P1) or (P2)) adapted to the data. The indicator function $\chi'(B)$ in Equation (5d) can also be alternatively replaced by an $l_1$ norm penalty $\|B\|_1$ that sums the magnitudes of the entries of matrix B.

For learning transforms that are tall matrices, another useful form of the transform learning regularizer is the overcomplete transform regularizer $$Q(\Phi) = -\log \det(\Phi^T \Phi) + \eta \Sigma_{j \neq k} |\langle \phi_j, \phi_k \rangle|^p + \chi''(\Phi) \quad (5e)$$

where $\phi_j$ denotes the j-th row of matrix Φ and $\chi''(\Phi)$ is the indicator function of the set of matrices Φ with unit norm rows, that is, satisfying $\|\phi_k\|_2 = 1 \forall k$. The unit norm penalty constrains the matrix Φ to have rows of unit norm. The negative log determinant term penalizes matrices Φ with small singular values and together with the unit norm constraint controls the condition number of Φ. In Equation (5c), $\langle \cdot, \cdot \rangle$ denotes the inner product, and $\eta > 0$ and $p > 0$ are parameters that may be selected based on the application. Selecting parameter p to a value significantly larger than 1, such as 8 may penalize the coherence between rows of Φ. Parameter η may be used to control the tradeoff between condition number and coherence of Φ.

Both P1 and P2 force the vectors $z_j$ to be sparse. The constrained form, P1, with the constraint as shown, sets a hard limit to the number of nonzero entries allowed in each of the vectors $z_j$. For optimal performance, this approach uses a heuristic to allow for varying sparsity levels $s_j$. When instead the sparsity constraint $\Sigma_{j=1}^{N_x} \|z_j\|_0 \leq s$ on all the sparse codes taken together is used, varying sparsity is allowed automatically. Similarly, the penalized form P2 automatically allows for variable sparsity levels, as we will show the following subsection. By allowing γ to vary for each $z_j$, the two formulations can be made to be equivalent. In the alternative, a fixed, global value for γ may be used. This approach also allows for a general sparsity-inducing penalty, such as the $l_1$ or $l_p$, norms.

Problems P1 and P2 can be written in one common form by introducing some additional notation. Define the indicator function $$\mathcal{I}_{s_j}(z_j) = \begin{cases} 0, & \|z_j\|_0 \leq s_j \\ \infty, & \|z_j\|_0 > s_j \end{cases}. \quad (6)$$

Next, we define $\psi_g:\mathbb{R}^k \to \mathbb{R}$ a depending on the problem P1 or P2. For P1, let $\psi_g(z_j) = \mathcal{I}_{s_j}(z_j)$; while for P2, we let $\psi_g(z_j) = \gamma g(z_j)$. Then we write both P1 and P2 in a single equation as:

$$\min_{\Phi, z_j} \sum_{j=1}^{N_x} \{0.5 \|\Phi x_j - z_j\|_2^2 + \psi_g(z_j)\} + \alpha Q(\Phi) \quad (7)$$

In both cases, the transform learning problem is solved using alternating minimization. We begin by fixing $\Phi$ and minimizing P1 or P2 with respect to the $z_j$. Then, with the $z_j$ fixed, we update $\Phi$. This procedure is repeated until a stopping criterion (also known as a stopping or halting condition) is satisfied. A possible stopping criterion is based on a measure of convergence, such as the relative difference between the values of the objective function in Equation (7) in successive iterations; in practice, the algorithm is stopped after a fixed number of iterations. We now discuss each minimization step in more detail.

Sparse Coding

In this step, the sparse codes $z_j$ are determined for fixed $\Phi$. Formulation (7) reduces to problems P1 and P2 for particular choices of $\psi_g:\mathbb{R}^k \to \mathbb{R}$ and the solution takes simple forms. For P1, for fixed $\Phi$, the problem reduces to:

$$\min_{\Phi, z} \sum_{j=1}^{N_x} 0.5 \|\Phi x_j - z_j\|_2^2 \quad (8)$$
$$\text{s.t. } \|z_j\|_0 \le s_j, \, j = 1, 2, \ldots, N_x$$

This problem can be solved independently for each index j, by retaining the $s_j$ elements of $\Phi x_j$ that are largest in magnitude and setting the rest to 0. This projection, called projection onto the $l_0$ ball, will be written $\Pi_{s_j}(\Phi x_j)$.

For (P2), for fixed $\Phi$, the problem reduces to $$\min_{z_j} \sum_{j=1}^{N_x} \{0.5 \|\Phi x_j - z_j\|_2^2 + \gamma g(z_j)\} \quad (9)$$

Again, this problem can be solved independently for each index j. The solution to (9) for each j is found using the proximal operator of g, defined as $$\text{prox}_g(z, \gamma) = \underset{u}{\text{argmin}} \, \frac{1}{2} \|z - v\|_2^2 + \gamma g(v). \quad (10)$$

With this definition, we can write the solution to Equation (9) as $z_j = \text{prox}_g(\Phi x, \gamma)$. For many sparsity inducing functions, $\text{prox}_g(z, \gamma)$ has a very simple form. For example, when $g(z) = \|z\|_0$, $\text{prox}_g(z, \gamma)$ separates into a sequence of one dimensional optimization problems for each component of the vector z. Let $\zeta = \text{prox}_{\|\cdot\|_0}(z, \gamma)$; then we can compute the m-th component of $\zeta$ as $$\zeta[m] = \begin{cases} z[m], & |z[m]| \ge \sqrt{2\gamma} \\ 0, & \text{else} \end{cases} \quad (11)$$

This operation is called hard thresholding. Similarly, if $g(z) = \|z\|_1$, we have that the m-th component of $\zeta = \text{prox}_{\|\cdot\|_1}(z, \gamma)$ is given by $$\zeta[m] = \begin{cases} \left(1 - \frac{\gamma}{|z[m]|}\right) z[m], & |z[m]| \ge \gamma \\ 0, & \text{else} \end{cases}, \quad (12)$$

an operation called soft thresholding. Taking $g(\cdot)$ to be either the $l_0$ or $l_1$ norm results in simple and computationally cheap solutions to the sparse coding problem (9). The choice of $l_1$ or $l_0$ norm is application specific. Choosing $g(z) = \|z\|_1$ tends to lead to smoother solutions, which may be desirable for imaging applications. In contrast, $g(z) = \|z\|_0$ tends to provide better noise removal at the expense of possible structured artifacts in the reconstruction.

Transform Update

With the $z_j$ fixed, we next minimize the objective function in Equation (7) with respect to $\Phi$. This stage is the same for both (P1) and (P2). Dropping terms that do not depend on $\Phi$, we solve $$\Phi^* = \underset{\Phi}{\text{argmin}} \sum_{j=1}^{N_x} \{0.5 \|\Phi x_j - z_j\|_2^2\} + \alpha Q(\Phi) \quad (13)$$

We introduce the matrices $X \in \mathbb{R}^{k \times N_x}$ and $Z \in \mathbb{R}^{k \times N_x}$, whose j-th column is formed as $x_j$ and $z_j$, respectively. Then we rewrite the problem as $$\Phi^* = \underset{\Phi}{\text{argmin}} \, 0.5 \|\Phi X - Z\|_F^2 + \alpha Q(\Phi) \quad (14)$$

Consider the case in which the transform learning regularizer $Q(\Phi)$ that is used is the one specified in Equation (5b), that is $(\Phi) = -\log|\det \Phi| + \|\Phi\|_F^2$. Then we solve $$\Phi^* = \underset{\Phi}{\text{argmin}} \sum_{j=1}^{N_x} \{0.5 \|\Phi x_j - z_j\|_2^2\} + \alpha(-\log|\det \Phi| + \|\Phi\|_F^2) \quad (14b)$$

The objective in Equation (14b) is differentiable, and we can calculate its gradient as:

$$\Phi X X^T - Z X^T + \alpha(2\Phi - \Phi^{-T}) \quad (15)$$

Thus we can minimize Equation (14b) using any standard smooth optimization scheme such as gradient descent, non-linear conjugative gradients (NLCG), or L-BFGS. This was the approach used in the initial transform learning publications.

Alternatively, it has been shown that the solution to Equation (14b) can be expressed in closed-form. We begin by decomposing using a Cholesky factorization to find $LL^T = XX^T + 2\alpha I_k$, where $I_{nk}$ is the k×k identity matrix. Next, let $L^{-1}XZ^T$ have full SVD of $G\Sigma R^T$. Then we can express the solution of Equation (14b) as:

$$\Phi^* = 0.5R(\Sigma + (\Sigma^2 + 4\alpha I_k)^{1/2})G^T L^{-1} \quad (16)$$

When dealing with complex-valued data X, all the matrix transpose $(\cdot)^T$ operations above are replaced with Hermitian $(\cdot)^H$ operations. The overall transform learning algorithm is presented as Algorithm 1 shown in FIG. 1, which operates recursively over P1 or P2 until a desired halting (stopping) criterion is satisfied. As discussed before, a possible stopping criterion is based on a measure of convergence such as the relative difference between values of the objective in successive iterations. Let us denote the value of the objective in Line 5 or in line 9 of Algorithm 1 of FIG. 1 at the i-th iteration by $J(\Phi^i)$, in the case of Problem Formulation P1, or P2, respectively. Then, the stopping condition may be as follows: stop the algorithm when the condition in Equation (16a) is satisfied $$|J(\Phi^i)-J(\Phi^{i-1})|/J(\Phi^i)<\xi_\Phi, \quad (16a)$$

where $\Phi^i$ is the solution to (16) in the i-th iteration, and $\xi_\Phi$ is a desired threshold. In practice, stopping the algorithm after a fixed number of iterations (determined empirically) works well in many applications.

Consider next the case that the transform learning regularizer $Q(\Phi)$ used in Equations (P1) or (P2) is the one specified in Equation (5c). In this case, we solve $$\Phi^* = \operatorname*{argmin}_{\Phi} 0.5\|\Phi X - Z\|_F^2 \text{ s.t. } \Phi^T\Phi = I_k \quad (16b)$$

In this case, the solution is again given in terms of the full SVD $G\Sigma R^T$ of the matrix $XZ^T$, as $\Phi^*=RG^T$. In the case when the data X are complex-valued, and $XZ^H$ has full SVD $G\Sigma R^H$, the solution to (16b) with constraint $\Phi^H\Phi=I_k$ is $\Phi^*=RG^H$.

Consider next the case that the transform to be learned is doubly sparse, so that the transform learning regularizer $Q(\Phi)$ used in Equations (P1) or (P2) is the one specified in Equation (5d), with. In this case, we solve $$\Phi^* = \operatorname*{argmin}_{\Phi} 0.5\|B\Phi_0 X - Z\|_F^2 + \alpha Q'(B) \text{ s.t. } \|B\|_0 \leq r \quad (16c)$$

where $Q'(B)=-\log|\det B|+\|B\|_F^2$. Equation (16c) does not have a closed-form solution. Instead, we solve it by an iterative method. We minimize the objective using several iterations of Conjugate gradients, and then project the solution onto the constraint set, by thresholding it to its r largest magnitude elements.

When the overcomplete transform learning regularizer is used in (P1) or (P2), the transform update becomes $$\Phi^* = \operatorname*{argmin}_{\Phi} 0.5\|\Phi X - Z\|_F^2 + \alpha Q'(\Phi) \text{ s.t. } \|\Phi_k\|_2 = 1 \forall k \quad (16d)$$

where $Q'(\Phi)=-\log \det(\phi^T\phi)+\eta\Sigma_{j\neq k}|\langle \phi_j,\phi_k\rangle|^p$. In this case, once again an iterative procedure is used for transform update.

Regularization with Adaptive Sparsifying Transforms

We discuss the use of the transform sparsity model to regularize inverse problems. To begin, we modify the transform sparsity model to act on our data. For spatio-temporal data such as images, we use transform sparsity to model small, possibly overlapping blocks of data called patches. This approach has several advantages over modeling the entire image directly. First, a model based on patches can have fewer parameters than a model for the entire image, leading to lower computational cost and reduced risk of overfitting. Second, because an image can be broken into many overlapping patches, we can extract an entire training set from a single image. This property allows the system to jointly learn a good transform while reconstructing the image.

The term image in this disclosure refers to an array of numbers stored in a computer, which depending on the application may correspond to a 2 dimensional (2D), three dimensional (3D), or higher dimensional (e.g., spatio-temporal) physical object. However, for notational convenience, let the image be represented as a vector $x\in\mathbb{R}^N$, e.g., by lexicographically vectorizing the image —i.e., by stacking its elements (pixels, voxels, as the case may be) in a particular order. We then represent the j-th image patch (i.e., j-th sub-image) as $R_j x$. The matrix $R_j$ extracts from x a length k vector corresponding to a vectorized image patch of size $\sqrt{k}\times\sqrt{k}$ pixels in the case of a 2D image, or $\sqrt[3]{k} \times \sqrt[3]{k} \times \sqrt[3]{k}$ voxels in the case of a 3D image, etc. The subscript j refers to the patch whose top-leftmost pixel is the j-th index of the lexicographically vectorized image. We call the distance between indices corresponding to the same image element in adjacent patches the stride length. The stride length controls the degree of overlap between successive patches. For a stride length of 1, successive patches are maximally overlapping with one another without coinciding, whereas for a stride length greater than 1, the overlap is reduced, until with a stride length equal to k (or greater), the patches do not overlap at all.

For many medical images, the object of interest is surrounded by a blank background. Thus we are free to extract patches that wrap around the image boundary. Alternatively, we can extract patches that lie entirely within the region of interest. Various other boundary conditions are possible, and the correct choice of boundary condition depends on the images being investigated.

For images that exhibit high dynamic range, such as CT images, it is useful to remove the mean of the extracted image patches before processing. This can be done using a modified patch extraction matrix $\tilde{R}j=(I_k-k^{-1}1_k I_k^T)R_j$, where $1_k$ is a length k vector consisting of all ones and $I_k$ is the k×k identity matrix, and $R_j$ is the previously described patch extraction matrix. For simplicity of the explanation, we will proceed using the unmodified $R_j$.

We now define our regularizer J(x) as the solution to the transform learning minimization problem:

$$J(x) = \min_{\Phi,z_j} \sum_{j=1}^{N_x} \frac{1}{2}\|\Phi R_j x - z_j\|_2^2 + \alpha Q(\Phi) + \psi_g(z_j) \quad (17)$$

where $\psi_g$ depends on the choice of either sparsity penalty or constraint, as discussed previously, and $Q(\Phi)$ is the desired transform learning regularizer, which may be selected as one of the alternative choices described above. For example, $Q(\Phi)=-\log|\det \Phi|+\|\Phi\|_F^2$ is a choice of the transform regularizer in (P3). We can combine our regularizer with our variational problem in Equation (5):

$$x^* = \operatorname*{argmin}_{x,\Phi,z_j} \psi_f(x) + \lambda\left(\sum_{j=1}^{N_x} \frac{1}{2}\|\Phi R_j x - z_j\|_2^2 + \alpha Q(\Phi) + \psi_g(z_j)\right), \quad (P3)$$

recalling that the functions $\psi_f$ and $\psi_g$ depend on whether we are using a penalty or constraint for the data fidelity and for the sparsity terms, respectively.

We solve Problem (P3) using alternating minimization. Alternating minimization is also known as block coordinate descent when alternating between more than two sub-problems and sets of variables, as is the case here, with three sub-problems: for x, for Φ, and for the collection of $z_j$.

These subproblems may be arbitrarily ordered. Further, the transform Φ can be learned 'offline' independent of the image reconstruction process. Let $\bar{x}_j$, j=1, 2, ... $N_{\bar{x}}$ denote a set of corpus of training vectors. These can be patches from images similar to those we plan to reconstruct; for example, high-quality CT or MRI images of a similar subject, or of the same subject in a previous scan, or different slices of the same part of the anatomy of the same subject. Let $\bar{z}_j = \Phi \bar{x}_j$ denote the sparsified version of $\bar{x}_j$. We can alternate between the sub-problems of updating Φ, and updating the collection $\bar{z}_j$, before moving to update the image.

Alternatively, we can learn the transform during the image reconstruction process. While the subproblems may be arbitrarily ordered, the system will begins by fixing x and updating both the collection of $z_j$ and Φ as discussed in the Transform Learning section. To this end, we define the collection of training vectors as $x_j = R_j x$ for j=1, ... $N_x$, and as described before, arrange them as columns of the matrix X. Once the update of Φ and the collection of $z_j$ has been completed, then, with these quantities fixed, we minimize the objective with respect to x. This procedure is illustrated in FIG. 2.

FIG. 2 is a flow chart depicting decision flow of alternating minimization for inverse problems with learned sparsifying transform regularization, e.g., the process of iterating between z, Φ and x update steps. The process may begin with initializing t and i each to 0 (zero) (202). The process may then determination whether to train on a corpus of image data (204). When a transform model has been pre-trained, then the process skips to block 214.

The transform learning iterations are indexed by the scalar l (216), and the image update iterations are indexed by the scalar t (236). The system begins with an initial image $x^0$ and an initial transform $\Phi^0$ (inputs). When the system learns learn Φ on a corpus, the system also uses the corpus of training data $\{\bar{x}_j\}$ as input to the system (208). We introduce $\hat{x}_j$ and $\hat{z}_j$ as temporary variables in block 208. When Φ is learned on a corpus, $\hat{x}_j = \bar{x}_j$, meaning, the pairs of variables coincide, for all j. On the other hand, when Φ is learned during reconstruction from the measurement data, then $\hat{x}_j = R_j x$, that is, the $\hat{x}_j$ are the patches of the image that is being reconstructed (206). In either case (206 or 208), the system executes the z update step (210) and the Φ update step (214) for the learning transform.

More specifically, the Φ and the collection of the $\hat{z}_j$ are updated until stopping condition (H1) is reached (220). This can be based on a stopping condition as in Equation (16a) or on a fixed number of iterations, as discussed previously. When the transform Φ is learned during reconstruction, a simple choice is to stop after as little as one iteration. Once the condition is satisfied, the $z_j$ are calculated from patches of the current image estimate $x^t$ (228). The index of Φ is also incremented (224). Note if the system is not learning from a corpus, $z_j$ may equal $\hat{z}_j$ and the system may be able to skip this step (228) depending on the ordering of subproblems.

As discussed before, depending on transform learning regularizer Q(Φ) that was chosen, the x-update step may be solved in closed form, or may require an iterative algorithm. Once the x-update step is completed, the system increments t (236) and continues alternating between updating $z_j^t$ and $x^t$ (228, 232) until stopping criterion (H2) is satisfied (240). This stopping criterion may be based on a sufficiently small relative change in the image estimate $x^t$, e.g., stop when the condition in Equation (17c) is satisfied $$\|x^t - x^{t-1}\|/\|x^{t-1}\| \leq \xi_x, \quad (17c)$$

where the norm in the previous expression is a desired norm, e.g., the $l_2$ norm, and $\xi_x$ is a desired threshold. A simple criterion is to stop after a fixed number of iterations. Once (H2) is satisfied, the system checks the final stopping condition (H3) (244). When the system learns from a corpus, (H3) should coincide with (H2). Otherwise, when the transform Φ is being learned during reconstruction, when (H3) is not satisfied, the system performs the update $\hat{x}_j \leftarrow R_j x^{t+1}$ for all j, and repeats the Φ and $\hat{z}_j$ update steps (starting back at 204). The stopping criterion (H3) can be a simple condition based on the overall number of iterations, or a condition involving a sufficiently small change in both the objective and the reconstructed image, that is simultaneous satisfaction of conditions such as those in Equations (16a) and (17c).

This alternating minimization scheme is applicable to any inverse problem that can be written in the form of Equation (5). Only the so-called x-update step will vary, and it will depend on the choice of $\psi_g$ and properties of the data fidelity function f(x,y).

CT Reconstruction

As discussed, computed tomography (CT) reconstruction is but one example of a case to which we can apply regularization with adaptive sparsifying transforms. In low-dose CT, we wish to reconstruct an image $x \in \mathbb{R}^N$ from photon count data $p \in \mathbb{R}^M$ from measurements y=Ax. The data vector $y \in \mathbb{R}^M$ contains the log of measured photon counts p, and the quantity [Ax][m] represents a forward projection of x along the m-th ray.

One may model the number of photons $p_m$ corresponding to the forward projection of x along the m-th ray, as a Poisson random variable: $p_m \sim \text{Poi}\{I_0 e^{-[Ax][m]}\}$ with mean $I_0 e^{-[Ax][m]}$. The photon flux $I_0$ represents the number of photons received at the m-th detector when no object is present in the x-ray path. We assume this quantity is known and constant for all projections. For simplicity of the presentation, we neglect both electronic readout noise and background events.

One can form the data fidelity function f(x,y) as the negative log likelihood associated with our Poisson statistical model. This can be used in applications involving relatively low photon counts, such as in reconstruction algorithms for positron emission tomography (PET), for single photon emission tomography (SPECT), and in algorithms for low light imaging. It would also be applicable to very low dose CT, or to CT with photon counting detectors. To perform the reconstruction using the method of regularization with adaptive sparsifying transform described above, we develop algorithms to solve the variational problem:

$$\min_{x, \Phi, z_j} f(x, y) + \lambda \left( \sum_{j=1}^{N_x} \frac{1}{2} \|\Phi R_j x - z_j\|_2^2 + \psi_g(z_j) + \alpha Q(\Phi) \right), \quad (18)$$

or the constrained problem $$\min_{x, \Phi, z_j} \sum_{j=1}^{N_x} \frac{\lambda}{2} \|\Phi R_j x - z_j\|_2^2 + \psi_g(z_j) + \alpha Q(\Phi) \quad (19)$$

$$\text{s.t. } f(x, y) \leq \varepsilon.$$

where the functions $\psi_g(\cdot)$ and Q(·) may be chosen as one of the previously described alternatives.

In both cases, the system may employ alternating minimization (also known as block coordinate descent). For fixed Φ and x, the system minimizes over $z_j$. Then with x and the collection of $z_j$ fixed, the system minimizes over $\Phi$ using either an iterative scheme or the closed form solutions, depending on the particular form of $\Phi$ (square, square unitary, doubly sparse, overcomplete, etc.) and transform learning regularizer $Q(\Phi)$ chosen. Finally, with $\Phi$ and the collection of $z_j$ fixed, the system minimizes over x. The $\Phi$ and $z_j$ update steps remain unchanged from the previous discussion. The minimization over x with $\Phi$ and the collection of $z_j$ fixed, corresponds to performing image reconstruction using a maximum a-posteriori (MAP) estimation formulation with a Poisson likelihood and a particular instance of a quadratic regularizer.

However, in applications with a reasonably large photon counts, such as in many applications of x-ray CT, an approximation to f(x,y) may be used to simplify and improve the computational efficiency of the image update (i.e., x update) step. One approach is to take f(x,y) to be a quadratic approximation to the full negative log likelihood, yielding $f(x,y)=0.5\|y-Ax\|_W^2$. Here $W \in \mathbb{R}^M$ is a diagonal matrix with m-th diagonal entry given by $p_m$ and $y_m = -\log(p_m/I_0)$. With this approximation in place, in order to perform the reconstruction using the method of regularization with adaptive sparsifying transform described above we develop algorithms to solve the variational problem:

$$\min_{x,\Phi,z_j} \frac{1}{2}\|y - Ax\|_W^2 + \lambda \left( \sum_{j=1}^{N_x} \frac{1}{2}\|\Phi R_j x - z_j\|_2^2 + \psi_g(z_j) + \alpha Q(\Phi) \right), \quad (18b)$$

or the constrained problem $$\min_{x,\Phi,z_j} \sum_{j=1}^{N_x} \frac{\lambda}{2}\|\Phi R_j x - z_j\|_2^2 + \psi_g(z_j) + \alpha Q(\Phi) \quad (19b)$$

$$\text{s.t. } \|y - Ax\|_W^2 \leq \varepsilon.$$

Similar to the case of Equations (18) and (19), the functions $\psi_g(\cdot)$ and $Q(\cdot)$ may be chosen as one of the previously described alternatives.

Equations (18b) and (19b) being instances of equations (18) and (19), respectively, they may be solved using the same alternating minimization described above for equations (18) and (19), the difference being the particular methods used to perform the minimization over x, for fixed $\Phi$ and fixed the collection of $z_j$. Here we detail several methods to perform the minimization over x.

x-Update for Penalized Form of Equation (18b)

Retaining only the terms that depend on x, we solve:

$$\min_x \frac{1}{2}\|y - Ax\|_W^2 + \sum_{j=1}^{N_x} \frac{\lambda}{2}\|\Phi R_j x - z_j\|_2^2. \quad (21)$$

In principle, the minimizer can be written in closed form:

$$x^* = \left( A^T W A + \lambda \sum_{j=1}^{N_x} R_j^T \Phi^T \Phi R_j \right)^{-1} \left( A^T W y + \sum_{j=1}^{N_x} R_j^T \Phi^T z_j \right) \quad (22)$$

Unfortunately, for CT reconstruction of images of sizes common in x-ray CT, the matrix $A^T W A + \lambda \sum_{j=1}^{N_x} R_j^T \Phi^T \Phi R_j$ cannot be directly inverted, and an iterative method is used to solve Equation (21). The conjugate gradient algorithm is a practical choice due to its efficiency and ease of implementation. However, the large dynamic range in W causes the matrix $A^T W A + \lambda \sum_{j=1}^{N_x} R_j^T \Phi^T \Phi R_j$ to be very poorly conditioned and difficult to precondition, leading to an expensive reconstruction step. To remedy this problem, we separate the influence of A and W using the Alternating Direction Method of Multipliers (ADMM).

We begin by introducing an auxiliary variable $u \in \mathbb{R}^M$ and rewrite the minimization problem in Equation (21) as $$\min_x \frac{1}{2}\|y - u\|_W^2 + \lambda \sum_{j=1}^{N_x} \frac{\lambda}{2}\|\Phi R_j x - z_j\|_2^2 \text{ s.t. } u = Ax. \quad (23)$$

Next, we form the Augmented Lagrangian function, written as:

$$\mathcal{L}(x, u, \eta) = \quad (24)$$

$$\frac{1}{2}\|y - u\|_W^2 + \frac{\lambda}{2}\sum_{j=1}^{N_x} \|\Phi R_j - z_j\|_2^2 + \frac{\mu}{2}\|u - Ax - \eta\|_2^2 - \frac{\mu}{2}\|\eta\|.$$

Here, $\mu > 0$ is a parameter that affects the rate of convergence of the algorithm but not the final solution. The vector $\eta \in \mathbb{R}^M$ represents a scaled version of the Lagrange multiplier of the constraint equation u=Ax Next, alternating minimization is used to find a saddle point of $L(x,u,\eta)$ by optimizing over x, u and $\eta$ in an alternating fashion.

At the i-th iteration, we solve the following subproblems:

$$x^{i+1} = \operatorname*{argmin}_x \mathcal{L}(x, u^i, \eta^i) \quad (25)$$

$$u^{i+1} = \operatorname*{argmin}_u \mathcal{L}(x^{i+1}, u, \eta^i) \quad (26)$$

$$\eta^{i+1} = \eta^i - (u^{i+1} - Ax^{i+1}) \quad (27)$$

Subproblem (25) is an unweighted least squares problem in x, with solution found by solving the linear system of equations:

$$\left( \mu A^T A + \lambda \sum_{j=1}^{N_x} R_j^T \Phi^T \Phi R_j \right) x^{i+1} = \mu A^T (u^i - \eta^i) + \lambda \sum_{j=1}^{N_z} R_j^T \Phi^T z_j. \quad (28)$$

As the effect of W is no longer present, the matrix $(A^T A + \lambda \sum_{j=1}^{N_x} R_j^T \Phi^T \Phi R_j)$ is better-conditioned. This problem can be solved using the conjugate gradients algorithm. In the context of CT, we can apply efficient Fourier preconditioners to further accelerate the convergence of this step. In practice, we may not require an exact solution to Problem (25), and instead settle for a few preconditioned conjugate gradient iterations.

The u update in Equation (26) can be solved in closed form as $$u^{i+1} = (W + \mu I_N)^{-1}(Wy + \mu(Ax^{i+1} + \eta^i)). \quad (29)$$

As W+μI is a diagonal matrix, this step is cheap. Finally, the η update step may employ only vector additions.

ADMM has changed the difficult Problem (21) into a series of subproblems that are much easier to solve. These subproblems are iterated until a convergence criterion is satisfied. However, as ADMM is used to solve a subproblem of the larger optimization problem of Equation (18), there is no need to force ADMM to fully converge. Still, a fixed number of ADMM iterations may not reduce the overall cost function, so we adopt the following heuristic strategy to define a stopping criterion for the ADMM iterations. The ADMM iterations (Equations (25), (26), and (27)) are repeated until we observe a decrement (by any amount, or by an amount greater than some desired threshold) in the cost function of Equation (21), then an additional three iterations are performed. An alternative stopping criterion is to ensure that the norms of the primal residual $$r^i = u^i - Ax^i \tag{29a}$$

and dual residual $$\zeta^{i+1} = A^T(u^{i+1} - u^i) \tag{29b}$$

are sufficiently small in either a relative or absolute sense. We will refer to the chosen stopping criterion as H4.

While Equations (25), (26), and (27) (with the solutions corresponding to the first two equations being determined by solving (28), and executing the computation in (29), respectively) were developed for use in low-dose CT imaging, these equations may be applicable to any linear inverse problem where $f(x,y) = \|y - Ax\|_W^2$ and the matrix $A^T W A$ is both extremely large and poorly conditioned.

The solution of Equation (18) for $f(x,y) = \|y - Ax\|_W^2$ using ADMM to solve the x-update step is summarized in Algorithm 2 (in FIG. 3). Algorithm 2 is a special case of the method in FIG. 2, with transform learning done directly on the patches of the iteratively reconstructed images. A system executing Algorithm 2 starts with a z-update of Equation (18) immediately followed with an Φ-update of Equation. The z-update and the Φ-update may continue until a stopping (or halting) condition is satisfied, e.g., a criterion such as in Equation (16a), or a set fixed number (possibly as small as one) of iterations that has been determined empirically to provide for sufficient convergence of these updates. Once the stopping condition is satisfied, the system may initialize u, η, and i each to zero.

The system may continue with using conjugate gradients (CG) to update $\tilde{x}^i$ with solution to line 8 of Algorithm 2 (FIG. 3). The system may then update $u^i$ as shown in line 9 of Algorithm 2 followed by updating $\eta^i$ as shown in line 10 of Algorithm 2. The system may then determine, with each iteration, whether an ADMM stopping condition, e.g., the stopping criterion (H4) for the ADMM iterations discussed earlier, has been satisfied. When the ADMM stopping condition has not yet been satisfied, the system increments the iteration counter i and returns to the conjugate gradients update of $\tilde{x}^i$, to continue ADMM iterations.

When the ADMM stopping condition has been satisfied, the system sets the image estimate $x^t$ for the overall t-th (current) iteration to the image estimate $\tilde{x}^i$ produced by the ADMM before it was stopped. The system may then determine whether an overall stopping condition has been satisfied, such as a sufficiently small relative change in the image estimate $x^t$, e.g., stop when a condition such as in Equation (17c) is satisfied. In practice, stopping the algorithm after a fixed number of iterations (determined empirically) works well in many applications.

When the overall stopping condition is satisfied, the system stops executing Algorithm 2; otherwise, the system returns to the P-update and the z-update for another overall iteration of Algorithm 2.

Acceleration Using Linearized ADMM

Even with the benefit of Fourier-based preconditioners, the most expensive step in Algorithm 2 is the solution of the least-squares problem of Equation (21), rewritten as Equation (28) in the above discussion. The dominant computation comes from the repeated application of the operator $A^T A$. The disclosed system may use the Linearized ADMM algorithm to accelerate this step. We begin by introducing an additional penalty term into the x-update of Equation (25):

$$x^{i+1} = \operatorname*{argmin}_x \frac{\lambda}{2} \sum_j \|\Phi R_j x - z_j\| + \frac{\mu}{2} \|u^i - \eta^i - Ax\|_2^2 + \|x - x_i\|_P^2, \tag{30}$$

where P is a positive definite matrix that can be chosen to improve the conditioning of this least squares problem. In particular, we take $P = \delta I_N - \mu A^T A$ then the solution to Equation (30) is given by:

$$x^{i+1} = \tag{31}$$

$$\left(\sum_j R_j^T \Phi^T \Phi R_j + \delta I_N\right)^{-1} \left(\lambda \sum_j R_j^T \Phi^T z_j + \delta x^i + \mu A^T(u^i - \eta^i - Ax^i)\right).$$

We have used the matrix P to remove the influence of $A^T A$ from the matrix inversion. The solution of Equation (31) depends on the boundary conditions present in the patch extraction operators $R_j$. As the region of interest in CT images is surrounded by air, which provides zero attenuation, we can extract image patches that wrap around the image boundary. In this case, the quantity $\Sigma_j R_j^T \Phi^T \Phi R_j$ is circularly shift-invariant and can be diagonalized using a Discrete Fourier Transform (DFT), so the matrix inversion can be solved in closed form. This approach is applicable to higher dimensional (3D/4D) CT imaging; for 2D CT, we use a 2D DFT; similarly, for 3D or 4D CT we use a 3D or 4D DFT. For simplicity, we limit the discussion to the 2D case.

In particular, we have $$F_2^H D_\Phi F_2 = \sum_j R_j^T \Phi^T \Phi R_j \tag{32}$$

where $F_2 \in \mathbb{R}^{N \times N}$ is the unitary 2D-DFT matrix, which operates on vectorized images of size N×1, and the superscript H denotes Hermitian (conjugate) transpose. The entries of $D_\Phi$ can be found by applying $F_2$ to the central column of $\Sigma_j R_j^T \Phi^T \Phi R_j$. The necessary column can be extracted by calculating $\Sigma_j R_j^H \Phi^T \Phi R_j e_c$, where $e_c \in \mathbb{R}^{N \times 1}$ is the vectorized standard basis element of $\mathbb{R}^{N \times N}$ corresponding to the central pixel of an image. In the case that N is even, $e_c$ corresponds to the pixel at location ((N+1)/2, (N+1)/2). Explicitly, we find $D_\Phi$ by $$D_\Phi = \operatorname{diag}\left\{F_2\left(\sum_j R_j^T \Phi^T \Phi R_j e_c\right)\right\}, \tag{33}$$

where diag{y} is an N×N diagonal matrix constructed from the N×1 vector y. Given $D_\Phi$, we can solve Equation (30) by:

$$x^{i+1} = F_2^H (\lambda D_\Phi + \delta I_N)^{-1} F_2 \left( \lambda \sum_j R_j^T \Phi^T z_j + \delta x^i + \mu A^T (u^i - \eta^i - Ax^i) \right) \quad (34)$$

If we do not allow for image patches to wrap around the boundary, the matrix $\Sigma_j R_j^T \Phi^T \Phi R_j$ is still well approximated by a circulant matrix with the diagonalization in (32). In this case, we solve the least squares problem (25) (or the corresponding system of linear equations (28)), but the circulant diagonalization defined by the product of the first three matrices in (34) provides an efficient preconditioner.

During the image update phase, $\Phi$ is held constant, so the diagonal of $D_\Phi$ can be computed and stored. The solution of Equation (30) can thus be computed in closed form and may only employ a product with A and $A^T$ as well as a 2D DFT and Inverse DFT. The DFTs can be computed efficiently using the Fast Fourier Transform (FFT) algorithm. This represents a significant improvement over the multiple products with $A^T A$ that are used to solve Equation (25) using conjugate gradients. Note that as we do not solve a least square problem involving $A^T A$, it is less important to precondition this matrix. This may prove especially beneficial for high angle 3D cone beam CT and other geometries where circulant preconditioners are less effective.

The parameter $\delta$ can be chosen such that $\delta I_N - \mu A^T A$ is positive definite, by setting $\delta > \mu \|A^T A\|_2$. We estimate this lower bound by performing power iteration on $A^T A$ and take $\delta$ to be slightly larger than this estimate. Because this only depends on the model for A and not on the data, this can be done once for a given system model A and the result stored, so that the cost of this power iteration is of little concern.

The solution of Equation (18) using linearized ADMM for the x-update step is summarized in Algorithm 3 (FIG. 4). Algorithm 3 is a special case of the method in FIG. 2, with transform learning done directly on the patches of the iteratively reconstructed images. Algorithm 3 differs from Algorithm 2 only in the $\tilde{x}$ update step. While Algorithm 3 employs more ADMM iterations to reach convergence than Algorithm 2, the closed form update for x leads to a net decrease in computational cost. In numerical experiments with 2D fan beam CT with a 512×512 pixel reconstructed image, this decrease in computational cost amounts to a 4× decrease in reconstruction time. This advantage may be even greater for imaging modalities for which the least squares image update in Algorithm 2 is difficult to precondition.

x Update for Constrained Form of Equation (19b)

Retaining only the terms that depend on x, we solve:

$$\min_x \sum_{j=1}^{N_x} \frac{1}{2} \|\Phi R_j x - z_j\|_2^2 \quad \text{s.t.} \quad \|y - Ax\|_W^2 \le \varepsilon. \quad (35)$$

The choice of $f(x,y) = \|y - Ax\|_W^2$ implies that each component of the measurement y[m] is well-modeled as a Gaussian random variable with mean (AX)[m] and variance $1/w_{mm}$. Thus, the quantity $\sqrt{w_{mm}} \cdot (y_m - (Ax)[m])$ is a standard normal random variable and the sum $\Sigma_{i=1}^M w_{mm} (y_m - (Ax)[m])^2$ is distributed according to the central $\chi_M^2$ distribution. It follows that the mean and variance of $\|y - Ax\|_W^2$ are M and 2M, respectively. This motivates the choice $\varepsilon = c \cdot (M + 2\sqrt{2M})$. The scalar c is a user-tunable parameter to account for measurement errors that are not captured by the Poisson noise model, such as discretization errors, scatter, beam hardening effects, or other unmodeled effects. Assume c=1 for the remainder of the present disclosure. In this case, if the measurement model holds exactly and x equals to the true image, one can determine the probability that the constraint in Equation (35) will be satisfied, by using the $\chi_M^2$ distribution. As a simpler approximation, applying the Central Limit Theorem for large M yields that the constraint in Equation (35) will be satisfied with probability of 98%. A similar analysis can be done for the full Poisson model.

One can solve this constrained minimization problem using the Split Augmented Lagrangian Shrinkage Algorithm (SALSA). This involves transforming the constrained minimization problem of Equation (35) into an unconstrained problem, then attacking the unconstrained problem using ADMM. We do this by defining an indicator function for our constraint set as: $C = \{u \in \mathbb{R}^M : \|y - u\|_W^2 \le \varepsilon\}$ as:

$$I_C(u) \triangleq \begin{cases} 0, & \|y - u\|_W^2 \le \varepsilon \\ \infty, & \text{else,} \end{cases} \quad (36)$$

and rewrite Equation (35) as the constrained problem:

$$\min_x \sum_{j=1}^{N_x} \frac{1}{2} \|\Phi R_j x - z_j\|_2^2 + I_C(Ax). \quad (37)$$

We now use the ADMM variable splitting method to solve Equation (37) in a method similar to that used for Equation (18). We again introduce the auxiliary variable $u \in \mathbb{R}^M$ and rewrite the problem as $$\min_x \sum_{j=1}^{N_x} \frac{1}{2} \|\Phi R_j x - z_j\|_2^2 + I_C(u) \quad \text{s.t.} \quad u = Ax, \quad (38)$$

then form the augmented Largangian as:

$$\mathcal{L}(x, u, \eta) = \sum_{j=1}^{N_x} \frac{1}{2} \|\Phi R_j - z_j\|_2^2 + I_C(u) + \frac{\mu}{2} \|u - Ax - \eta\|_2^2 - \frac{\mu}{2} \|\eta\|_2^2 \quad (39)$$

Here, $\mu > 0$ is a parameter that affects the rate of convergence of the algorithm but not the final solution. The vector $\eta \in \mathbb{R}^M$ represents a scaled version of the Lagrange multiplier of the constraint equation $u = Ax$.

Next, alternating minimization (aka block coordinate descent) is used to find a saddle point of $\mathcal{L}(x,u,\eta)$ by optimizing over x, u and $\eta$ in an alternating fashion.

At the i-th iteration, we solve the following subproblems:

$$x^{i+1} = \operatorname*{argmin}_x \mathcal{L}(x, u^i, \eta^i) \quad (40)$$

$$u^{i+1} = \operatorname*{argmin}_u \mathcal{L}(x^{i+1}, u, \eta^i) \quad (41)$$

$$\eta^{i+1} = \eta^i - (u^{i+1} - Ax^{i+1}) \quad (42)$$

The x and η updates are identical to the case of Equation (18) and the corresponding Lagrangian in (24), save for the absence of the parameter λ in the Lagrangian in (39), and therefore its absence in the updates. In particular, the solution to Equation (40) is given as the solution $x^{i+1}$ to the following system of linear equations, $$\left(\mu A^T A + \sum_{j=1}^{N_x} R_j^T \Phi^T \Phi R_j\right) x^{i+1} = \mu A^T(u^i - \eta^i) + \sum_{j=1}^{N_x} R_j^T \Phi^T z_j \quad (43)$$

which can be solved using the preconditioned conjugate gradients method as previously discussed. The u update of Equation (41) differs in this form. We solve:

$$u^{i+1} = \operatorname*{argmin}_{u} \frac{\mu}{2} \|u - (Ax^{i+1} + \eta^{i+1})\|_2^2 + I_C(u). \quad (44)$$

Equation (41) can be viewed as the projection of the point $Ax^{i+1} + \eta^{i+1}$ onto the constraint set C. When W=I, this constraint set is a sphere, and the solution is given easily by setting $$v = \epsilon^*(Ax^{i+1} + \eta^{i+1})/\|Ax^{i+1} + \eta^{i+1}\|_2^2. \quad (44a)$$

In the more general case, C is an ellipsoidal constraint set. We use a change of variables to reformulate the projection into a quadratic optimization problem with an unweighted $l_2$ constraint, then use the fast iterative shrinkage-thresholding algorithm (FISTA) algorithm to solve the reformulated problem.

Let $I_{\tilde{C}}$ be the indicator function for the unweighted $l_2$ norm ball of radius $\sqrt{\epsilon}$, defined as:

$$I_{\tilde{C}}(u) \triangleq \begin{cases} 0, & \|u\|_2^2 \leq \varepsilon \\ \infty, & \text{else} \end{cases}. \quad (45)$$

This new indicator function is related to $I_C$ by $I_C(u) = I_{\tilde{C}}(W^{1/2}(u-y))$. Here, the diagonal entries of $W^{1/2}$ are given by $\sqrt{w_{mm}}$, which is well-defined, because the entirety of W is to be positive. We now pose the u-update problem as the solution of:

$$\operatorname*{argmin}_{u} I_{\tilde{C}}\left(W^{\frac{1}{2}}(u-y)\right) + \frac{\mu}{2}\|u - (\eta^i + Ax^{i+1})\|_2^2. \quad (46)$$

It is the placement of $W^{1/2}$ within the indicator function that prohibits a closed-form solution to this proximity mapping. We can untangle these terms by exploiting the invertibility of $W^{1/2}$. We define the change of variables $\zeta = W^{1/2}(u-y)$ and rewrite the problem as:

$$\operatorname*{argmin}_{\zeta} I_{\tilde{C}}(\zeta) + \frac{\mu}{2}\left\|W^{-\frac{1}{2}}\zeta - (\eta^i + Ax^{i+1} - y)\right\|_2^2. \quad (47)$$

This is no longer in the form of a proximal mapping, but is instead the sum of a convex, lower semi-continuous indicator function and a quadratic term. Problems of this form can be efficiently solved using proximal gradient methods. We make use of the FISTA algorithm, chosen for its ease of implementation and rapid convergence. The complete algorithm for solving Equation (41) is depicted as Algorithm 4 in FIG. 5. The dominant computations in the u-update step are multiplication by $W^{-1/2}$ and the evaluation of the $l_2$ norm. The multiplication is an inexpensive operation as W is a diagonal matrix. As FISTA is used to solve a subproblem of the overall optimization problem, we do not require that FISTA reach convergence, and instead use a fixed number of 15 iterations as the halting condition, although a different number of iterations, or a different halting condition, e.g., one based on a desired convergence criterion, may be chosen. The chosen stopping condition is called H5 as illustrated in Algorithm 4.

The complete algorithm for solving Equation (19b) is depicted as Algorithm 5 in FIG. 6. Algorithm 5 is a special case of the method in FIG. 2, with transform learning done directly on the patches of the iteratively reconstructed images. The primary difference between Algorithm 5 and Algorithm 3 is the form of the u-update step. Whereas Algorithm 3 performs this step in closed form, Algorithm 5 uses an iterative solution using Algorithm 4. The benefit of this approach is that there is no need to tune the regularization parameter Δ. Moreover, Algorithm 5 computes the u-update step quickly. These approaches taken together leads to a net decrease in computation time, as there is no need to perform multiple image reconstructions for various values of λ.

MR Reconstruction

As discussed, magnetic resonance (MR) reconstruction is but one example of a case to which we can apply regularization with adaptive sparsifying transforms. Magnetic Resonance Imaging (MRI) is a popular non-invasive imaging technique that allows excellent visualization of anatomical structure and physiological function. However, it is a relatively slow imaging modality due to the fact that the data, which are samples in k-space of the spatial Fourier transform of the object, are acquired sequentially in time. Therefore, numerous techniques have been proposed to reduce the amount of data required for accurate reconstruction, with the aim of enabling much higher clinical throughput.

Recently, some of the present inventors proposed a significantly superior and popular reconstruction scheme called Dictionary Learning MRI (DLMRI), which assumes that the (overlapping) 2D patches of the underlying MR image (or, 3D patches in the case of dynamic MRI) obey the synthesis model. DLMRI learns a synthesis sparsifying dictionary, and reconstructs the image simultaneously from highly under sampled k-space data. We have shown significantly superior reconstructions for DLMRI, as compared to non-adaptive CSMRI. However, the algorithm for DLMRI reconstruction involves synthesis sparse coding, which is a well-known NP-hard problem, and therefore computationally very expensive, even with approximate algorithms such as Orthogonal Matching Pursuit (OMP).

The present disclosure incorporates ideas from recent work on the sparsifying transform model (and its variations such as the doubly sparse transform model). The disclosed approach does not suffer from the drawbacks that limit the synthesis model. Specifically, as opposed to synthesis sparse coding, transform sparse coding is computationally easier, more exact, and involves thresholding. Moreover, transform learning is highly efficient and scales more favorably with problem size compared to synthesis dictionary learning. The computational efficiency and superior convergence properties of transform learning make it particularly attractive for CSMRI.

In the present disclosure, transform learning may be used for compressed sensing MRI, a method referred to as TLMRI, which is a method also used for other degraded data scenarios. The disclosed method (regularization with adaptive sparsifying transforms) simultaneously learns the sparsifying transform and reconstructs the MR image from only under sampled k-space data. The proposed approach is much faster (by more than ten times) than current state-of-the-art approaches involving synthesis dictionaries, while also providing better reconstruction quality. This makes it much more amenable for adoption for clinical use.

We wish to recover the vectorized image as $x \in \mathbb{R}^N$ from k-space or Fourier measurements $y \in \mathbb{C}^M$, obtained through the subsampled Fourier matrix $F_u$ in $\mathbb{C}^{M \times N}$ as $y = F_u x + e$. Matrix $F_u$ denotes a mapping from a discretized image to the Fourier or k-space samples. Here $e \in \mathbb{C}^M$ represents measurement noise. In the context of MR imaging, we may model e as being a Gaussian random vector with mean 0 (zero) and variance $\sigma^2$. Thus, we can form a data fidelity function f(x,y) as the scaled negative log likelihood associated with this model, yielding:

$$f(x, y) = \frac{1}{2} \|y - F_u x\|_2^2 \tag{48}$$

We can incorporate adaptive sparsifying transform regularization by solving the following variational problem, which is an instance of (P3) introduced before:

$$\min_{x, \Phi, z_j} \frac{1}{2}\|y - F_u x\|_2^2 + \lambda \left( \frac{1}{2} \sum_{j=1}^{N_x} \|\Phi R_j x - z_j\|_2^2 + \psi_g(z_j) + \alpha Q(\Phi) \right) \tag{49}$$

Similar to previously presented equations in this disclosure in which these functions appear, the functions $\psi_g(\cdot)$ and $Q(\cdot)$ may be chosen as one of the previously described alternatives. In MRI, the transform matrix $\Phi$ is complex valued typically, so as to sparsify complex-valued data effectively.

We will examine the cases where $\psi_g$ represents a sparsity constraint or a sparsity penalty separately.

MR Reconstruction with Sparsity Constraint

Let $\psi_g(z_j)$ be the indicator function for the sparsity constraint given by:

$$\varphi_g(z_j) = \begin{cases} 0, & \|z_j\|_0 \le s_j \\ \infty, & \text{else} \end{cases} \tag{50}$$

Here the $s_j$ are integers constraining the maximum number of non-zero components in the vector $z_j$. For optimal performance, the $s_j$'s are adapted for each patch. To facilitate this, we introduce a new set of 'denoised' image patch variables, $\hat{x}_j$ and use variable splitting to write our transform learning regularized problem as:

$$\min_{x, \hat{x}_j, \Phi, z_j} \frac{1}{2}\|y - F_u x\|_2^2 + \tag{51}$$

$$\lambda \left( \sum_{j=1}^{N_x} \left\{ \frac{1}{2} \|\Phi \hat{x}_j - z_j\|_2^2 + \psi_g(z_j) + \frac{\tau}{2}\|R_j x - \hat{x}_j\|_2^2 \right\} + \alpha Q(\Phi) \right)$$

This means that the new variable $\hat{x}_j$ should be close to the j-th image patch $R_j x$. We now use alternating minimization (aka block coordinate descent) to solve Equation (51). With all variables fixed except for $\Phi$, Equation (51) reduces to the transform learning update problem, with the solution similar to what was discussed previously in Equation (16). Specifically, the system computes the optimal transform. As before, in the step of adapting the transform $\Phi$, we define the collection of training vectors as $x_j = R_j x$ for $j = 1, \ldots N_x$, and arrange them as columns of the matrix X. We also arrange the sparse codes $z_j$ as columns of matrix Z. We begin by decomposing using a Cholesky factorization to find $LL^H = XX^H + 2\alpha I_k$, where $I_k$ is the k×k identity matrix. Next, let $L^{-1}XZ^H$ have full SVD of $\Sigma R^H$. Then the system can express the solution of transform update as $$\Phi^* = 0.5 R (\Sigma + (\Sigma^2 + 4\alpha I_k)^{1/2}) G^H L^{-1} \tag{52a}$$

Next, with all parameters fixed except for x, Equation (51) reduces to the least-squares problem:

$$x^* = \arg\min_x \frac{1}{2}\|y - F_u x\|_2^2 + \lambda \sum_{j=1}^{N_x} \frac{\tau}{2} \|R_j x - \hat{x}_j\|_2^2 \tag{52b}$$

with solution given by:

$$x^* = \left( F_u^H F_u + \lambda \tau \sum_j R_j^T R_j \right)^{-1} \left( F_u^H y + \lambda \tau \sum_j R_j^T \hat{x}_j \right) \tag{53}$$

where the superscript H denotes Hermitian conjugation. As the objects of interest in MRI are surrounded by air, we are free to extract patches that wrap around the image boundary. Then $\Sigma_j R_j^T R_j = k I_N$, where there are k pixels in each patch and $I_N$ is the N×N identity matrix. The matrix $F_u^H F_u$ has a special form when the k-space samples are obtained on a Cartesian grid in Fourier space, that is, when $F_u = \Omega F_2$ where $F_2 \in \mathbb{R}^{N \times N}$ the unitary 2D-DFT matrix, which operates on vectorized images of size N×1, and $\Omega$ is an M×N matrix of zeros and ones, selecting elements of $F_2$. This may also apply to so-called non-Cartesian acquisition, e.g., with pseudo-radial or pseudo-spiral k-space trajectories, where the sample are chosen to lie on a Cartesian grid. In this case, the matrix $\Delta = F_2 F_u^H F_u F_2^H = \Omega_T \Omega$ with $\Omega$ being a diagonal matrix with 1's in any entries where we have taken measurements and 0 (zero) otherwise. Thus, Equation (53) reduces to $$F_2^H \left( \Delta + \tau \sum_j R_j^T R_j \right)^{-1} \left( \Omega^T y + \tau F_2 \sum_j R_j^T \hat{x}_j \right) \tag{53b}$$

which only involves diagonal matrix inversion and FFTs can be computed cheaply. For general sampling patterns $F_u$, where samples are not obtained on a Cartesian grid, Equation (52), which is a least-squares problem, may be solved using Conjugate Gradients, or another desired least-square solver.

With all variables fixed except for the $z_j$, the Equation (51) reduces to:

$$\min_{z_j} \|\Phi \hat{x}_j - z_j\|_2^2 \quad \text{s.t.} \|z_j\|_0 \le s_j \tag{54}$$

Equation (54) can be solved by retaining the $s_j$ entries of $\Phi \hat{x}_j$ with largest magnitude; an operation written $\Pi_{s_j}(\Phi z_j)$, which was introduced previously.

With all variables fixed except $\hat{x}_j$, the problem of Equation (51) reduces to:

$$\min_{\hat{x}_j} \|\Phi \hat{x}_j - z_j\|_2^2 + \tau \|R_j x - \hat{x}_j\|_2^2 \tag{55}$$

with solution given by:

$$\hat{x}_j = (\Phi^T \Phi + \tau I)^{-1} (\tau R_j x + \Phi^T z_j) \tag{56}$$

The matrix we invert is small k x k and identical for all j. Thus we can precompute and store a factorization, such as a Cholesky factorization, of this matrix to save on computation.

We now discuss a method to choose the sparse coding parameters $s_j$. We set a threshold, C, which can be based on the noise or incoherent aliasing variance $\sigma^2$. For each j, the system increases $s_j$ until the error $\|R_j x - \hat{x}_j\|_2^2$ falls below C. The entire reconstruction algorithm using this procedure is summarized as Algorithm 6 (shown in FIG. 7). Algorithm 6 is a special case of the method in FIG. 2, with the learning done directly on the patches of the iteratively reconstructed images. The stopping condition (H3 on Line 18 of Algorithm 6 may be based on a sufficiently small relative change in the image estimate $x^t$, i.e., stop when the condition in Equation (17c) is satisfied. A simple alternative criterion is to stop after a fixed number of iterations.

MR Reconstruction with Sparsity Penalty

A somewhat simpler approach is to utilize a sparsity penalty, rather than a constraint. This removes the need to do use variable splitting. Let $\phi_g(z_j) = \gamma g(z_j)$ for some sparsity promoting function g, such as an $l_1$ or $l_0$ norm. We want to solve:

$$\min_{x, \Phi, z_j} \frac{1}{2} \|y - F_u x\|_2^2 + \lambda \left( \sum_{j=1}^{N_x} \left\{ \frac{1}{2} \|\Phi R_j x - z_j\|_2^2 + \gamma g(z_j) \right\} + \alpha Q(\Phi) \right) \tag{57}$$

We again use alternating minimization as we did with CT reconstruction discussed above. With all variables fixed except for $\Phi$, the minimization required in Equation (57) reduces to the transform learning problem discussed previously, and Algorithm 1 From FIG. 1 is again applicable.

With the variables fixed except for the $z_j$, the minimization required in Equation (57) reduces to $$z^j = \operatorname{argmin}_z \|\Phi R_j x - z\|_2^2 + \gamma g(z) \tag{58}$$

with solution given by $\operatorname{prox}_g$, $(\Phi R_j x, y)$, similar to the previous discussion.

With all variables fixed except for x, we solve the least squares problem:

$$\min_x \frac{1}{2} \|y - F_u x\|_2^2 + \frac{\lambda}{2} \sum_j \|\Phi R_j x - z_j\|_2^2 \tag{59}$$

This has a closed form solution given by $$x^* = \left( F_u^H F_u + \lambda \sum_j R_j^T \Phi^H \Phi R_j \right)^{-1} \left( F_u^H y + \lambda \sum_j R_j^T \Phi^H z_j \right) \tag{60}$$

As discussed, we can extract every image patch and allow the patches to wrap around the image boundary. In this case, the quantity $\Sigma_j R_j^T \Phi^T \Phi R_j$ is circularly shift-invariant and can be diagonalized using a 2D Discrete Fourier Transform (DFT), so the matrix inversion can be solved in closed form. In particular, we have:

$$F_2^H D_\Phi F_2 = \sum_j R_j^T \Phi^H \Phi R_j \tag{61}$$

where $F_2 \in \mathbb{R}^{N \times N}$ is the aforementioned unitary 2D-DFT matrix. The entries of $D_\Phi$ can be easily found by applying $F_2$ to the central (corresponding to center of k-space) column of $\Sigma_j R_j^T \Phi^H \Phi R_j$. The necessary column can be extracted by calculating $\Sigma_j R_j^T \Phi^H \Phi R_j e_c$, where $e_c \in \mathbb{R}^{N \times 1}$ is the vectorized standard basis element of $\mathbb{R}^{N \times N}$ corresponding to the central pixel of an image. Explicitly, we find $D_\Phi$ by $$D_\Phi = \operatorname{diag}\left\{ F_2 \left( \sum_j R_j^T \Phi^H \Phi R_j e_c \right) \right\} \tag{62}$$

where diag$\{y\}$ is an N×N diagonal matrix constructed from the N×1 vector y. Thus we can efficiently compute $x^*$ as:

$$x^* = F_2^H (\Delta + \lambda D_\Phi)^{-1} F_2 \left( F_u^H y + \sum_j R_j^T \Phi^H z_j \right) \tag{63}$$

where $\Delta = F_2 F_u^H F_u F_2^H$. As discussed before, when the k-space samples fall on a Cartesian grid, $\Delta$ is a diagonal matrix with 1 wherever samples are taken and 0 elsewhere. Equation (63) then reduces to $$F_2^H (\Delta + \tau D_\Phi)^{-1} \left( \Omega^T y + \tau F_2 \sum_j R_j^T \hat{x}_j \right) \tag{63b}$$

This is an efficient computation, requiring only a single FFT/IFFT pair and multiplication by a diagonal matrix. This algorithm is summarized as Algorithm 7 (shown in FIG. 8). Algorithm 7 is a special case of the method in FIG. 2, where the learning is done directly on the patches of the iteratively reconstructed images. The stopping condition (H6) on Line 9 may be similar to stopping condition H5 on Line 18 of Algorithm 6. Otherwise, when $\Delta$ does not have the above mentioned convenient form, an iterative least-squares solver, such as CG is used to solve the least-squares problem in Equation (59).

Figure 9:
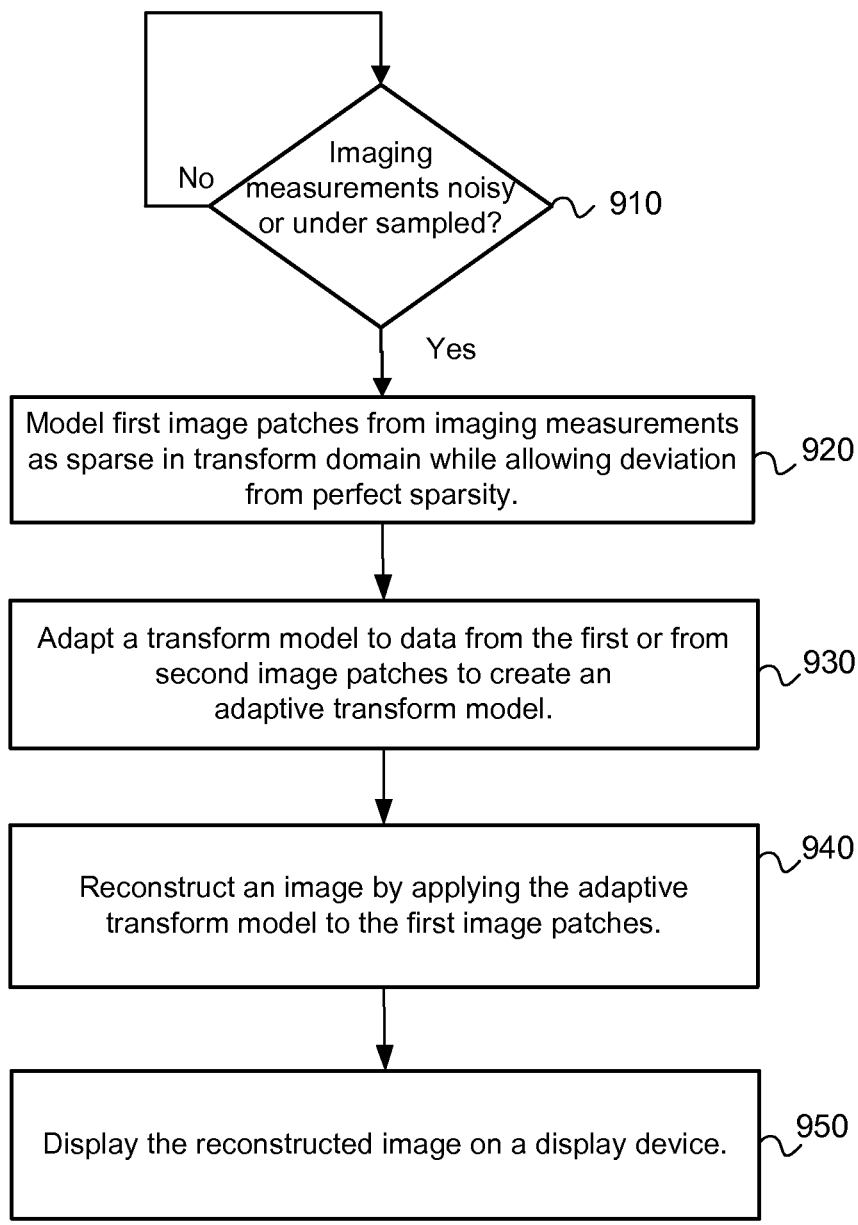
FIG. 9 is an exemplary method for reconstructing an image from multiple patches extracted from limited or reduced quality measurement imaging data.

FIG. 9 is an exemplary method for reconstructing an image from multiple patches extracted from limited or reduced quality measurement imaging data. The method may begin by determining that available imaging measurements are noisy and/or under sampled (910). The method may then model first image patches from imaging measurements as sparse in the transform domain while allowing deviation from perfect sparsity (920). The method may also adapt a transform model to data from the first or from a second image patches to create an adaptive transform model through machine learning (930). The second image patches may be a subset of the first image patches, or may be image patches from a different image. The modeling and the adapting may occur concurrently as an iterative, learning process. The method may further reconstruct an image (from the imaging data) by applying the adaptive transform model to the first image patches (940). The method may further store for displaying or actually display the reconstructed image on a display device for viewing by a user (950).

Figure 10:
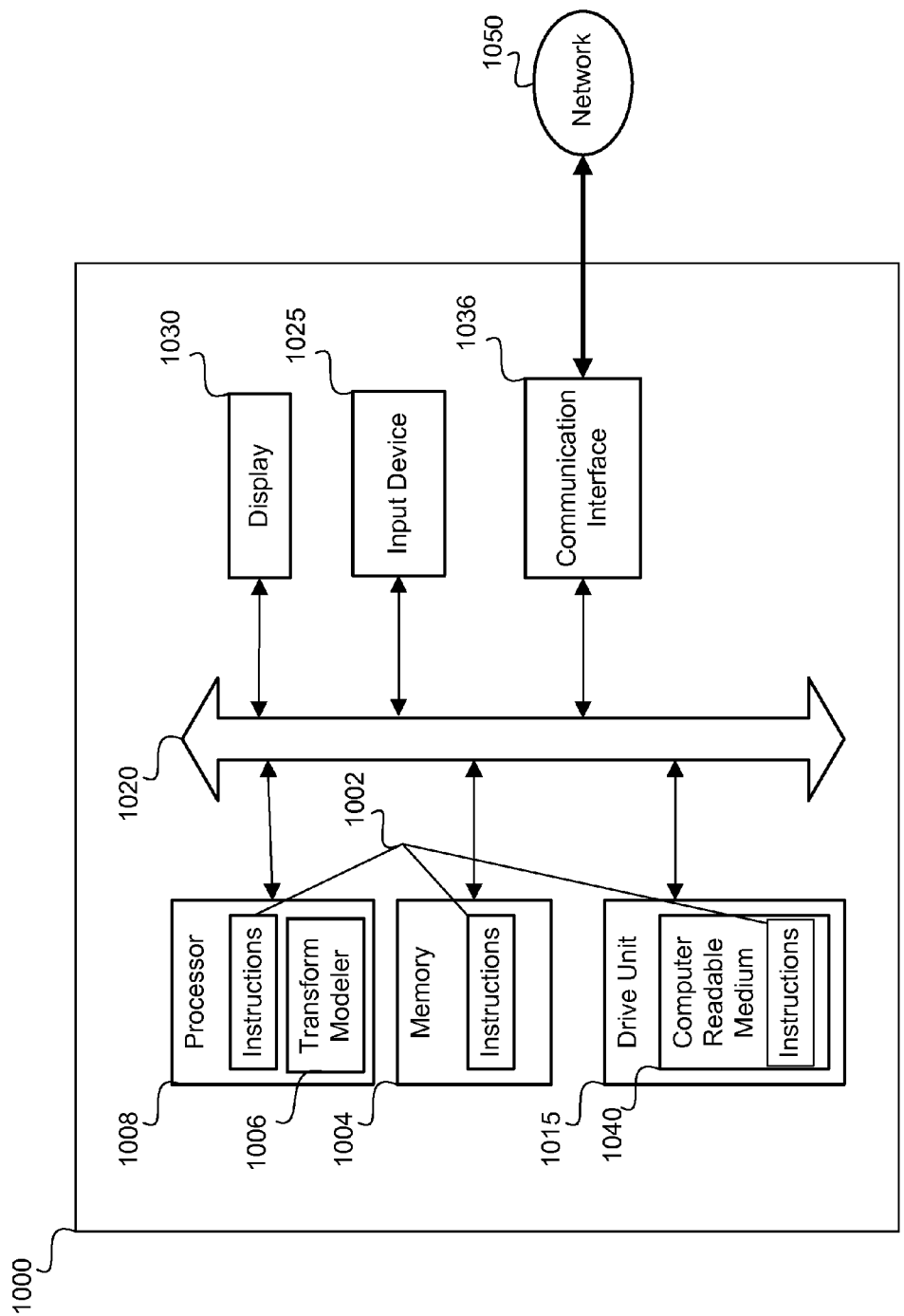
FIG. 10 is a computer system that may be used for processing image patches from imaging measurements according to the disclosed embodiments.

FIG. 10 illustrates a general computer system 1000, which may represent a computed tomography (CT) system, a magnetic resonance imaging (MRI) system, other imaging system, or a processing device coupled with an imaging system for processing imaging data from an imagining system. The computer system 1000 may include an ordered listing of a set of instructions 1002 that may be executed to cause the computer system 1000 to perform any one or more of the methods or computer-based functions disclosed herein. The computer system 1000 may operate as a stand-alone device or may be connected to other computer systems or peripheral devices, e.g., by using a network 1010.

In a networked deployment, the computer system 1000 may operate in the capacity of a server or as a client-user computer in a server-client user network environment, or as a peer computer system in a peer-to-peer (or distributed) network environment. The computer system 1000 may also be implemented as or incorporated into various devices, such as a personal computer or a mobile computing device capable of executing a set of instructions 1002 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 1000 may include a memory 1004 on a bus 1020 for communicating information. Code operable to cause the computer system to perform any of the acts or operations described herein may be stored in the memory 1004. The memory 1004 may be a random-access memory, read-only memory, programmable memory, hard disk drive or any other type of volatile or non-volatile memory or storage device.

The computer system 1000 may include a processor 1008, such as a central processing unit (CPU) and/or a graphics processing unit (GPU). The processor 1008 may include one or more general processors, digital signal processors, application specific integrated circuits, field programmable gate arrays, digital circuits, optical circuits, analog circuits, combinations thereof, or other now known or later-developed devices for analyzing and processing data. The processor 1008 may implement the set of instructions 1002 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The processor 1008 may include a transform modeler 1006 or contain instructions for execution by a transform modeler 1006 provided a part from the processor 1008. The transform modeler 1006 may include logic for executing the instructions to perform the transform modeling and image reconstruction as discussed in the present disclosure.

The computer system 1000 may also include a disk or optical drive unit 1015. The disk drive unit 1015 may include a non-transitory computer-readable medium 1040 in which one or more sets of instructions 1002, e.g., software, can be embedded. Further, the instructions 1002 may perform one or more of the operations as described herein. The instructions 1002 may reside completely, or at least partially, within the memory 1004 and/or within the processor 1008 during execution by the computer system 1000. Accordingly, the databases displayed and described above with reference to FIGS. 2 and 20 may be stored in the memory 1004 and/or the disk unit 1015.

The memory 1004 and the processor 1008 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1000 may include an input device 1025, such as a keyboard or mouse, configured for a user to interact with any of the components of system 1000. It may further include a display 1030, such as a liquid crystal display (LCD), a cathode ray tube (CRT), or any other display suitable for conveying information. The display 1030 may act as an interface for the user to see the functioning of the processor 1008, or specifically as an interface with the software stored in the memory 1004 or the drive unit 1015.

The computer system 1000 may include a communication interface 1036 that enables communications via the communications network 1010. The network 1010 may include wired networks, wireless networks, or combinations thereof. The communication interface 1036 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. A system comprising:
   at least one processing device;
   non-transitory computer-readable medium storing instructions executable by the at least one processing device to employ transform learning as a regularizer for reconstructing an image from limited or corrupted imaging measurements, to generate a reconstructed image, wherein the limited or corrupted imaging measurements include a component that is a function of at least two pixels of the reconstructed image, wherein ones of the at least two pixels reside in different image patches of a plurality of image patches of the reconstructed image, and the instructions to cause the at least one processing device to:
   reconstruct the image, from the imaging measurements, by iterative minimization of an adaptive image reconstruction optimization objective comprising a transform-model-based image regularizer and a data fidelity term formed using the limited or corrupted imaging measurements, wherein the minimization is expressed as $$\min_x f(x, y) + \lambda J(x)(i),$$

wherein x is the reconstructed image, y are the imaging measurements, f (x, y) is the data fidelity term that includes interactions between data from the different image patches, $\lambda$ is a regularization strength parameter, and J(x) is the transform-model-based image regularizer of the reconstructed image, which is obtained as an approximate minimum solution to a transform learning minimization problem that comprises:
   sparsification error of the plurality of image patches of the reconstructed image, comprising a measure of discrepancy between the plurality of image patches transformed by a transform operator and sparse approximations of the plurality of image patches, wherein the sparse approximations comprise sparse codes;
   a sparsity promoting function that is one of a penalty or a set of constraints on the sparse approximations to the plurality of images patches; and
   a transform learning regularizer that controls properties of the transform operator; and
   store the reconstructed image in the computer-readable medium, the reconstructed image displayable on a display device.

2. The system of claim 1, wherein the plurality of image patches comprise a set of second image patches that approximate a plurality of reconstructed image patches of the reconstructed image.

3. The system of claim 2, wherein the instructions are further executable by the at least one processing device to solve an adaptive image reconstruction optimization problem in conjunction with solving the transform learning minimization problem by performing minimization that alternates between solving for one or more of: (i) the transform operator; (ii) the sparse codes; (iii) the set of second image patches; and (iv) the reconstructed image in a signal domain.

4. The system of claim 2, wherein J(x) is an approximation to a minimum solution, $J_{opt}(X)$, of the transform learning minimization problem expressed as one of:

$$J_{opt}(x) = \min_{\Phi, Z} \sum_{j=1}^{N_x} h(\Phi x_j, z_j) + \alpha Q(\Phi) + \gamma g(Z); \quad \text{(ii)}$$

$$J_{opt}(x) = \min_{\Phi, Z, \hat{x}} \sum_{j=1}^{N_x} \{h(\Phi \hat{x}_j, z_j) + \tau \|\hat{x}_j - x_j\|_2^2\} + \alpha Q(\Phi) + \gamma g(Z); \quad \text{(iii)}$$

or another variation of (ii) involving variable splitting; and
wherein $x_j$ is a vectorized patch of the reconstructed image x, $\hat{X}$ is a matrix whose columns $\hat{x}_j$ are the approximations to $x_j$, $\Phi$ is a sparsifying transform operator of a transform model, $z_j$ are vectorized sparse codes corresponding to $\Phi x_j$ or $\Phi \hat{x}_j$, Q($\Phi$) is the transform learning regularizer, $\alpha$ is a transform regularization strength parameter, g: $\mathbb{R}^{k \times N_x} \to \mathbb{R}$ is the sparsity promoting function that encourages sparsity in matrix Z, whose columns are vectors $z_j$, h: $\mathbb{R}^k \times \mathbb{R}^k \to \mathbb{R}$ is a sparsification error measure that is a penalty or a constraint, and $\gamma$ is a sparsity penalty strength parameter.

5. The system of claim 4, wherein the sparsification error measure is a function of a norm of a difference of two vector arguments of h.

6. The system of claim 4, wherein the transform learning regularizer Q($\Phi$) includes at least one of:

$$Q(\Phi) = -\log|\det\Phi| + \|\Phi\|_F^2; \quad \text{(i)}$$

$$Q(\Phi) = X(\Phi) = \begin{cases} 0 & \Phi^H \Phi = I_k \\ \infty & \text{else} \end{cases}; \quad \text{(ii)}$$

$$Q(\Phi) = Q(B\Phi_0) = -\log|\det B| + \|B\|_F^2 + \chi'(B); \text{ or} \quad \text{(iii)}$$

$$Q(\Phi) = -\log\det(\Phi^H \Phi) + \eta \sum_{j \neq k} |\langle \phi_j, \phi_k \rangle|^p + \chi''(\Phi), \quad \text{(iv)}$$

wherein in (ii), $I_k$ is the identity matrix of size k, and wherein in (iii), $\Phi = B\Phi_0$, with $\Phi_0$ being a fixed sparsifying transform and $\chi'(B)$ is a sparsity promoting penalty for B, and wherein in (iv), $\phi_j$ denotes the j-th row of matrix ($\Phi$) and $\chi''(\Phi)$ is a function controlling scaling of Φ, and ⟨•,•⟨ denotes the standard Euclidean inner product, and η>0 and p >0 are desired parameters.

7. The system of claim 1, wherein to reconstruct the image, the instructions are further executable by the at least one processing device to perform at least one of:
   minimize an expression that includes the sparsification error, a sparsity penalty, the transform learning regularizer, and a data fidelity penalty;
   minimize, subject to a sparsity constraint, an expression that includes a sum of the sparsification error, the transform learning regularizer, and the data fidelity penalty;
   minimize, subject to a data fidelity constraint, an expression that includes the sparsification error, the transform learning regularizer, and the sparsity penalty; or
   minimize, subject to a data fidelity constraint and a sparsity constraint, an expression that includes the sparsification error and the transform learning regularizer.

8. The system of claim 1, wherein the instructions are further executable by the one processing device to iteratively minimize the adaptive image reconstruction optimization objective in conjunction with iteratively solving the transform learning minimization problem.

9. The system of claim 1, wherein the instructions are further executable by the at least one processing device to alternate between:
   iteratively minimizing the objective of the transform learning minimization problem; and
   updating the reconstructed image by iteratively minimizing the adaptive image reconstruction optimization objective.

10. The system of claim 9, wherein iteratively minimizing the transform learning minimization objective comprises alternating between minimization with respect to the transform operator and the sparse codes.

11. A method comprising:
   adapting, using a processor of at least one computing device having non-transitory computer-readable medium for storing data and instructions, a transform model to sparsify a set of image patches obtained from an image of a set of images, the transform model based on the set of images being approximately sparse in a transform domain, wherein the image is obtained from imaging measurements derived from at least one of magnetic resonance imaging (MRI), computed tomography (CT), positron emission tomography (PET), or single photon emission computed tomography (SPECT), the imaging measurements being degraded or under sampled and including a component that is a function of at least two pixels of the image, wherein ones of the at least two pixels reside in different image patches of the set of image patches;
   reconstructing, using the processor, the image from the imaging measurements, to generate a reconstructed image, by iteratively minimizing an adaptive image reconstruction optimization objective comprising a transform-model-based regularizer of the transform model and a data fidelity term formed using the imaging measurements, wherein minimizing is expressed as $$\min_x f(x, y) + \lambda J(x)(i),$$

wherein x is the reconstructed image, y are the imaging measurements, f(x, y) is the data fidelity term that includes interactions between data from the different image patches, λ is a regularization strength parameter, and J(x) is the transform-model-based image regularizer of the reconstructed image, which is obtained as an approximate minimum solution to a transform learning minimization problem that comprises:
   sparsification error of the set of image patches of the reconstructed image, comprising a measure of discrepancy between the set of image patches transformed by a transform operator and sparse approximations of the set of image patches, wherein the sparse approximations comprise sparse codes;
   a sparsity promoting function that is one of a penalty or a set of constraints on the sparse approximations to the set of image patches; and
   a transform learning regularizer that controls properties of the transform operator; and
   storing the reconstructed image in the computer-readable medium, the reconstructed image displayable on a display device.

12. The method of claim 11, further comprising solving an adaptive image reconstruction optimization problem that is a minimization of the combination of the transform-model-based regularizer and one of a data fidelity penalty or constraint.

13. The method of claim 12, wherein the adapting and reconstructing comprise at least one of:
   minimizing an expression that includes the sparsification error, a sparsity penalty, the transform learning regularizer, and the data fidelity penalty;
   minimizing, subject to a sparsity constraint, an expression that includes the sparsification error, the transform learning regularizer, and the data fidelity penalty;
   minimizing, subject to a data fidelity constraint, an expression that includes the sparsification error, the transform learning regularizer, and the sparsity penalty; or
   minimizing, subject to a data fidelity constraint and a sparsity constraint, an expression that includes the sparsification error and the transform learning regularizer.

14. The method of claim 13, wherein the data fidelity penalty or constraint employ a measurement matrix modeling a data acquisition process comprising at least one of:
   a Fourier encoding matrix, wherein the data fidelity penalty or constraint is a function of the image and imaging measurements from the MRI; or
   a matrix modeling weighted line integrals in at least one of CT, PET, or SPECT, wherein the data fidelity penalty or constraint in each of CT, PET or SPECT is a function of the image and detector readings.

15. A non-transitory computer-accessible storage medium comprising data and instruction that, when accessed by a processing device, cause the processing device to:
   extract, using the processing device, a set of image patches of an image from limited or corrupted imaging measurements that include a component that is a function of at least two pixels of the image, wherein ones of the at least two pixels reside in different image patches of the set of image patches;
   adapt, using the processing device, a transform model to the set of image patches of the image, to model the set of image patches as sparse in a transform domain in which the image is approximately sparsified;

reconstruct the image, using the processing device and to generate a reconstructed image, by minimization of an optimization objective comprising a transform-model-based regularizer of the transform model and a data fidelity term formed using the limited or corrupted imaging measurements obtained from an imaging device, wherein the minimization is expressed as $$\min_x f(x, y) + \lambda J(x)(i),$$

wherein x is the reconstructed image, y are the imaging measurements, f(x, y) is the data fidelity term that includes interactions between data from the different image patches, λ is a regularization strength parameter, and J(x) is the transform-model-based image regularizer of the reconstructed image, which is obtained as an approximate minimum solution to a transform learning minimization problem that comprises:
  sparsification error of the set of image patches of the reconstructed image, comprising a measure of discrepancy between the set of image patches transformed by a transform operator and sparse approximations of the set of image patches, wherein the sparse approximations comprise sparse codes;
  a sparsity promoting function that is one of a penalty or a set of constraints on the sparse approximations to the set of images patches; and
  a transform learning regularizer that controls properties of the transform operator; and
  store the reconstructed image in the computer-accessible storage medium, the reconstructed image displayable on a display device.

16. The non-transitory computer-accessible storage medium of claim 15, wherein the set of image patches comprises a set of second image patches that approximate a plurality of reconstructed image patches of the reconstructed image, wherein the instructions are further executable by the processing device to solve an adaptive image reconstruction optimization problem that is a minimization of the combination of the transform-model-based regularizer and one of a data fidelity penalty or constraint.

17. The non-transitory computer-accessible storage medium of claim 16, wherein the instructions further to cause the processing device to solve the adaptive image reconstruction optimization problem in conjunction with solving the transform learning minimization problem by performing minimization that alternates between updating one or more of: (i) the transform operator; (ii) the sparse codes; (iii) the set of second image patches; and (iv) the reconstructed image.

18. The non-transitory computer-accessible storage medium of claim 17, wherein the transform learning minimization problem is expressed as $$J(x) = \min_{\Phi, z_j} \sum_{j=1}^{N_x} \frac{1}{2} \|\Phi R_j x - z_j\|_2^2 + \alpha Q(\Phi) + \psi_g(Z)$$

wherein x is an image to be reconstructed, $R_j$ is an operator that extracts an image patch from x as a vector $R_j x$, α is a regularization strength parameter, Φ is a sparsifying transform operator of the transform model, $z_j$, are vectorized sparse codes corresponding to $\Phi x_j$, $\psi_g(x)$ is a sparsity promoting penalty, and Q (Φ) is a transform learning regularizer.

19. The non-transitory computer-accessible storage medium of claim 17, wherein the adaptive image reconstruction optimization problem is expressed as $$x^* = \arg\min_{x, \Phi, z_j} \psi_f(x) + \lambda \left( \sum_{j=1}^{N_x} \frac{1}{2} \|\Phi R_j x - z_j\|_2^2 + \alpha Q(\Phi) \right) + \psi_g(Z).$$

wherein x is the image to be reconstructed, $R_j$ is an operator that extracts an image patch from x as a vector $R_j x$, α is a regularization strength parameter, Φ is a sparsifying transform matrix of the transform model, Z is a matrix having its columns equal to vectorized sparse codes corresponding to $x_j$, j=1,2, ... N_x, $\psi_g$ (Z) is a sparsity promoting penalty, $\psi_f$ (x) is the one of the data fidelity penalty or constraint, and Q(Φ) is a transform learning regularizer, wherein when $\psi_f$ (x) is chosen, $\psi_f$ (x) is one of equal to f(x,y), a data fidelity function, or given by barrier function:

$$I_C(x) = \begin{cases} 0 & f(x, y) \le \varepsilon \\ \infty & \text{else} \end{cases}.$$

20. The non-transitory computer-accessible storage medium of any of claim 18 or 19, wherein when $\psi_g$ (Z) is chosen, $\psi_g$ (Z) is expressed as one of:

$$\gamma g(Z); \qquad \text{(i)}$$

$$\sum_{j=1}^{N_x} I_{s_j}(z_j); \text{ or} \qquad \text{(ii)}$$

$$I_s(Z) = \begin{cases} 0, & \sum_{j=1}^{N_x} \|z_j\|_0 \le s \\ \infty, & \text{else} \end{cases} \qquad \text{(iii)}$$

where g(x) is a sparsity-promoting function $$I_{s_j}(z_j) = \begin{cases} 0, & \|z_j\|_0 \le s_j \\ \infty, & \|z_j\|_0 > s_j \end{cases},$$

γ is a parameter for penalty level, $s_j$ is a constraint parameter for sparsity of $z_j$, and s is a sparsity constraint parameter for the matrix Z.

* * * * *